US012528584B2

(12) United States Patent
Allwein et al.

(10) Patent No.: US 12,528,584 B2
(45) Date of Patent: Jan. 20, 2026

(54) RELATIVE NAVIGATION FOR AERIAL RECOVERY OF AIRCRAFT

(71) Applicant: General Atomics Aeronautical Systems, Inc., San Diego, CA (US)

(72) Inventors: Michael Joseph Allwein, San Luis Obispo, CA (US); David Childers, San Diego, CA (US); Keith Richards, Ramona, CA (US); Jesse Stence, Leander, TX (US); Tony Goetz, San Diego, CA (US)

(73) Assignee: General Atomics Aeronautical Systems, Inc., San Diego, CA (US)

( * ) Notice: Subject to any disclaimer, the term of this patent is extended or adjusted under 35 U.S.C. 154(b) by 57 days.

(21) Appl. No.: 18/066,935

(22) Filed: Dec. 15, 2022

(65) Prior Publication Data

US 2023/0415891 A1    Dec. 28, 2023

Related U.S. Application Data

(60) Provisional application No. 63/367,010, filed on Jun. 24, 2022.

(51) Int. Cl.
*B64D 5/00* (2006.01)
*B64D 3/02* (2006.01)
(Continued)

(52) U.S. Cl.
CPC ................. *B64D 3/02* (2013.01); *B64D 5/00* (2013.01); *B64D 47/08* (2013.01); *G01S 17/86* (2020.01);
(Continued)

(58) Field of Classification Search
CPC .. B64D 3/02; B64D 5/00; B64D 47/08; G01S 17/86; G01S 19/43; B64U 2201/104
See application file for complete search history.

(56) References Cited

U.S. PATENT DOCUMENTS 2,365,827 A    12/1944    Liebert
2,464,073 A    3/1949    Cotton
(Continued)

FOREIGN PATENT DOCUMENTS

CN    103434646    12/2013
CN    104015931    9/2014
(Continued)

OTHER PUBLICATIONS

Caizzone et al., "Compact 6+1 antenna array for robust GNSS applications", IEEE, Aug. 31, 2016, retrieved on Dec. 30, 2023, available at https://ieeexplore.ieee.org/stamp/stamp.jsp?tp=&arnumber=7533853.

(Continued)

*Primary Examiner* — Mathew Franklin Gordon
(74) *Attorney, Agent, or Firm* — Knobbe, Martens, Olson & Bear, LLP

(57) ABSTRACT

Embodiments of a system for recovery of a target aircraft by a host aircraft, the system including a towline having a proximal section configured to be coupled with the host aircraft and a distal section configured to be paid out from the host aircraft, a fitting coupled with the distal section of the towline, wherein the fitting comprises a housing, a global navigation satellite system receiver (e.g., without limitation, a GPS receiver), and a global navigation satellite system antenna. In some embodiments, when paid out from the host aircraft, the towline is configured to be in a substantially vertical orientation. The system of some embodiments can further include a capture mechanism configured to be coupled with a fuselage of the target aircraft and configured to capture the fitting.

30 Claims, 17 Drawing Sheets

(51) Int. Cl.
*B64D 47/08* (2006.01)
*G01S 17/86* (2020.01)
*G01S 19/43* (2010.01)

(52) U.S. Cl.
CPC ........ *G01S 19/43* (2013.01); *B64U 2201/104* (2023.01)

(56) References Cited

U.S. PATENT DOCUMENTS

| | | |
|---|---|---|
| 2,692,121 A | 10/1954 | Brown |
| 3,013,743 A | 12/1961 | Keeney |
| 3,049,319 A | 8/1962 | Elder et al. |
| 3,088,693 A | 5/1963 | Brown |
| 3,100,093 A | 8/1963 | McQuillen et al. |
| 3,167,278 A | 1/1965 | Roberge |
| 3,207,480 A | 9/1965 | Fulton, Jr. |
| 4,256,012 A | 3/1981 | Cowart et al. |
| 5,074,402 A | 12/1991 | Bender-Zanoni et al. |
| 5,103,712 A | 4/1992 | Minovitch |
| 5,315,561 A | 5/1994 | Grossi |
| 5,983,161 A | 11/1999 | Lemelson et al. |
| 6,056,236 A | 5/2000 | Weimer et al. |
| 6,079,664 A | 6/2000 | Salzberger |
| 6,100,842 A | 8/2000 | Dreier et al. |
| 6,532,192 B1 | 3/2003 | Reid |
| 6,932,299 B2 | 8/2005 | Beyerle et al. |
| 7,059,564 B2 | 6/2006 | Dennis |
| 7,066,430 B2 | 6/2006 | Dennis et al. |
| 7,097,137 B2 | 8/2006 | McDonnell |
| 7,900,866 B2 | 3/2011 | Kutzmann et al. |
| 8,038,090 B2 | 10/2011 | Willson et al. |
| 8,074,931 B2 | 12/2011 | Schroeder |
| 8,231,083 B2 | 7/2012 | Kutzmann et al. |
| 8,991,793 B1 | 3/2015 | Bernhardt |
| 9,878,777 B2 | 1/2018 | Bernhardt et al. |
| 10,246,189 B2 | 4/2019 | Paunicka et al. |
| 10,266,267 B2 | 4/2019 | Paunicka et al. |
| 10,589,859 B2 | 3/2020 | Foo et al. |
| 10,618,676 B2 | 4/2020 | Chen et al. |
| 10,913,534 B1 | 2/2021 | Brum |
| 11,008,102 B2 | 5/2021 | Ryan et al. |
| 11,639,223 B1 | 5/2023 | Allwein et al. |
| 11,724,807 B2 | 8/2023 | Koller et al. |
| 2003/0071164 A1 | 4/2003 | Carlson et al. |
| 2004/0089767 A1 | 5/2004 | Harrison |
| 2005/0110676 A1 | 5/2005 | Heppe et al. |
| 2005/0133665 A1 | 6/2005 | Dennis et al. |
| 2006/0000949 A1 | 1/2006 | Schroeder |
| 2006/0202088 A1 | 9/2006 | Padan |
| 2007/0108345 A1 | 5/2007 | McDonnell |
| 2008/0234884 A1 | 9/2008 | Von Thal |
| 2008/0265097 A1 | 10/2008 | Stecko et al. |
| 2009/0132165 A1 | 5/2009 | Gabrielsson et al. |
| 2009/0326736 A1* | 12/2009 | Waid ........ G01S 19/40 701/3 |
| 2010/0025523 A1 | 2/2010 | Kutzmann et al. |
| 2010/0038477 A1 | 2/2010 | Kutzmann et al. |
| 2010/0191450 A1 | 7/2010 | Ravenscroft et al. |
| 2010/0217526 A1 | 8/2010 | McElveen et al. |
| 2010/0237183 A1 | 9/2010 | Wilson et al. |
| 2010/0276537 A1 | 11/2010 | Kutzmann et al. |
| 2011/0001011 A1 | 1/2011 | Degiorgis et al. |
| 2011/0006151 A1 | 1/2011 | Beard |
| 2012/0059536 A1 | 3/2012 | Pepicelli et al. |
| 2012/0251280 A1 | 10/2012 | Jaurand et al. |
| 2013/0082137 A1 | 4/2013 | Gundlach et al. |
| 2013/0103249 A1 | 4/2013 | Pieper et al. |
| 2013/0320138 A1 | 12/2013 | Dickson et al. |
| 2013/0334370 A1 | 12/2013 | Herrero et al. |
| 2014/0129126 A1 | 5/2014 | Richardson et al. |
| 2015/0293225 A1 | 10/2015 | Riley et al. |
| 2016/0023761 A1 | 1/2016 | McNally |
| 2016/0036519 A1* | 2/2016 | Loomis ........ G01S 19/41 370/316 |
| 2016/0152339 A1 | 6/2016 | von Flotow et al. |
| 2017/0146659 A1 | 5/2017 | Kovermann et al. |
| 2017/0349283 A1 | 12/2017 | Paunicka et al. |
| 2017/0355458 A1 | 12/2017 | Chen et al. |
| 2018/0265211 A1 | 9/2018 | Burgener et al. |
| 2018/0281986 A1 | 10/2018 | Chang et al. |
| 2018/0327093 A1 | 11/2018 | Von Flotow et al. |
| 2019/0031347 A1 | 1/2019 | Duan et al. |
| 2019/0063881 A1 | 2/2019 | Abramov et al. |
| 2019/0068953 A1 | 2/2019 | Choi et al. |
| 2019/0088156 A1 | 3/2019 | Choi et al. |
| 2019/0110270 A1 | 4/2019 | Chen |
| 2019/0112049 A1 | 4/2019 | Phan et al. |
| 2019/0315462 A1* | 10/2019 | Skladman ........ B64D 45/00 |
| 2019/0352015 A1 | 11/2019 | Hall |
| 2020/0072587 A1 | 3/2020 | Bailey et al. |
| 2020/0108922 A1 | 4/2020 | Smith et al. |
| 2020/0108923 A1 | 4/2020 | Smith et al. |
| 2020/0108924 A1 | 4/2020 | Smith et al. |
| 2020/0108925 A1 | 4/2020 | Smith et al. |
| 2020/0108926 A1 | 4/2020 | Smith et al. |
| 2020/0108927 A1 | 4/2020 | Bosworth et al. |
| 2020/0148387 A1 | 5/2020 | Johansen et al. |
| 2020/0156790 A1 | 5/2020 | von Flotow et al. |
| 2020/0279495 A1 | 9/2020 | von Flotow et al. |
| 2020/0331630 A1 | 10/2020 | Ricaud |
| 2020/0346781 A1 | 11/2020 | Bosma |
| 2021/0039804 A1 | 2/2021 | Ropers |
| 2021/0122486 A1 | 4/2021 | Sanchez et al. |
| 2021/0129982 A1 | 5/2021 | Collins et al. |
| 2021/0165108 A1* | 6/2021 | Heinonen ........ G01S 19/40 |
| 2021/0237901 A1 | 8/2021 | von Flotow et al. |
| 2021/0239814 A1 | 8/2021 | Pimentel et al. |
| 2021/0264799 A1* | 8/2021 | Belt ........ B64U 80/70 |
| 2021/0286379 A1 | 9/2021 | Wittenberg et al. |
| 2021/0325542 A1 | 10/2021 | Ashjaee |
| 2021/0354825 A1* | 11/2021 | Koller ........ B64U 70/20 |
| 2022/0009628 A1 | 1/2022 | Hamilton |
| 2022/0009632 A1 | 1/2022 | Gallo |
| 2022/0066477 A1 | 3/2022 | Shi et al. |
| 2022/0100207 A1 | 3/2022 | Koyanagi |
| 2022/0144449 A1 | 5/2022 | Gamble et al. |
| 2023/0150668 A1 | 5/2023 | Allwein et al. |
| 2023/0150691 A1 | 5/2023 | Allwein et al. |
| 2024/0017857 A1 | 1/2024 | Allwein et al. |

FOREIGN PATENT DOCUMENTS

| | | |
|---|---|---|
| CN | 107933925 | 4/2018 |
| CN | 207578847 U | 7/2018 |
| CN | 109969401 | 7/2019 |
| CN | 110239726 | 9/2019 |
| CN | 110371296 | 10/2019 |
| CN | 110588986 | 12/2019 |
| CN | 107697303 | 10/2020 |
| CN | 111776148 | 10/2020 |
| CN | 112731502 | 4/2021 |
| CN | 113168190 | 7/2021 |
| CN | 113264188 | 8/2021 |
| CN | 113386962 | 9/2021 |
| CN | 113589848 | 11/2021 |
| CN | 113885577 | 1/2022 |
| ES | 1258116 U | 12/2020 |
| FR | 2421106 | 10/1979 |
| GB | 523991 | 7/1940 |
| GB | 566201 | 12/1944 |
| GB | 804704 | 11/1958 |
| GB | 2373488 | 9/2002 |
| KR | 10-2263294 | 6/2021 |
| KR | 10-2263704 | 6/2021 |
| RU | 2111154 C1 | 5/1998 |
| RU | 2712403 C1 | 1/2020 |
| TW | M608094 U | 2/2021 |
| WO | WO 2015/195175 | 12/2015 |
| WO | WO 2016/167849 | 10/2016 |
| WO | WO 2019/113971 | 6/2019 |
| WO | WO 2022/003343 | 1/2022 |
| WO | WO 2023/091132 | 5/2023 |

(56) References Cited

FOREIGN PATENT DOCUMENTS

| WO | WO 2023/091133 | 5/2023 |
|---|---|---|
| WO | WO 2024/015397 | 1/2024 |
| WO | WO 2024/010655 | 3/2024 |

OTHER PUBLICATIONS

Parlin et al., "Jamming of UAV remote control systems using software defined radio", IEEE, Jun. 20, 2018, retrieved on Dec. 30, 2023, available at https://ieeexplore.ieee.org/stamp/stamp.jsp?tp=&arnumber=8398711.
International Search Report and Written Opinion in application No. PCT/US2023/024179, mailed on Feb. 9, 2024, in 19 pages.
International Search Report and Written Opinion in application No. PCT/US2023/027419, mailed on Dec. 10, 2023, in 15 pages.
U.S. Appl. No. 18/350,648, filed Jul. 11, 2023, Allwein et al.
Cole, Major Michael W., "Inflight Rearming", Air Command and Staff College, Air University, Maxwell AFB, AL, Student Report No. 88-570, in 37 pages (1988).
Genuth, "ABRAcadabra—Airborne ReArming", The Future of Things, https://thefutureofthings.com/3023-abracadabra-airborne-rearming/, accessed on May 22, 2022, in 5 pages.
Rescue Hoist Model 44301, A Rugged, Reliable Rescue Hoist, collinaerospace.com/hoistandwinch, printed 2019 in 2 pages.
Rescue Hoist Model 42305 A Rugged, Reliable Rescue Hoist, collinaerospace.com/hoistandwinch, printed 2019 in 2 pages.
Rescue Hoist Model 42325/44314, A Rugged, Reliable Rescue Hoist, collinaerospace.com/hoistandwinch, printed 2019 in 2 pages.
TE Connectivity Ltd., Rochester Cables, Engineered Cable Solutions for Harsh Environments, (2016) 16 pages.
International Preliminary Report on Patentability and Written Opinion application No. PCT/US2023/024179, dated Dec. 31, 2024, 15 pages.
International Preliminary Report on Patentability and Written Opinion in application No. PCT/US2023/027419, dated Dec. 18, 2024, in 11 pages.
Office Action in Canadian application No. 3,259,857, dated Jul. 8, 2025, in 4 pages.
Office Action in Australian application No. 2021474918, dated Jul. 2, 2025, in 4 pages.

* cited by examiner

RELATIVE NAVIGATION FOR AERIAL RECOVERY OF AIRCRAFT

INCORPORATION BY REFERENCE TO ANY PRIORITY APPLICATIONS

Any and all applications for which a foreign or domestic priority claim is identified in the Application Data Sheet as filed with the present application are hereby incorporated by reference under 37 CFR 1.57.

This application claims the benefit under 35 U.S.C. § 119(e) of U.S. Provisional Patent Application No. 63/367,010, titled "RELATIVE NAVIGATION FOR AERIAL RECOVERY OF AIRCRAFT," filed Jun. 24, 2022, the entire contents of which are incorporated by reference herein and form a part of this specification for all purposes as if fully set forth herein.

BACKGROUND

Field

This disclosure relates generally to unmanned aerial vehicles (UAV's), more particularly to navigational systems and methods for recovery of an airborne UAV or other target aircraft by an airborne supply aircraft.

Description

UAV's are aircraft that are piloted without a human pilot onboard. UAV's may be used for transport, surveillance, communications, weapons, and other uses. UAV's typically take off from the ground and return to the ground, which limits their versatility and usefulness. Recovery of UAV's or other aircraft (which can be manned or unmanned) in-flight may simplify missions and improve outcomes. Existing approaches to in-flight recovery can be complex and unreliable, and often risk significant damage to the aircraft. Accordingly, improvements to these and other drawbacks are desirable.

SUMMARY OF SOME EXEMPLIFYING EMBODIMENTS

The embodiments disclosed herein each have several aspects no single one of which is solely responsible for the disclosure's desirable attributes. Without limiting the scope of this disclosure, its more prominent features will now be briefly discussed. After considering this discussion, and particularly after reading the Detailed Description, the skilled artisan will understand how the features of the embodiments described herein provide advantages over existing systems, devices, and methods for recovering UAV's or other aircraft in flight.

The following disclosure describes non-limiting examples of some embodiments. Other embodiments of the disclosed systems and methods may or may not include the features described herein. Moreover, disclosed advantages and benefits may apply only to certain embodiments of the invention and should not be used to limit the disclosure.

Disclosed herein are embodiments of a system for recovery of a target aircraft by a host aircraft, the system including a towline having a proximal section configured to be coupled with the host aircraft and a distal section configured to be paid out from the host aircraft, a fitting coupled with the distal section of the towline, wherein the fitting comprises: a housing, a global navigation satellite system receiver, and a global navigation satellite system antenna.

Any embodiments of the devices, systems, and methods disclosed herein can include, in additional embodiments, one or more of the following features, components, and/or details, in any combination with any of the other features, components, and/or details of any other embodiments of the devices, systems, and methods disclosed herein: wherein the fitting further comprises a ballast; wherein, when paid out from the host aircraft, the towline is configured to be in a substantially vertical orientation; further comprising a capture mechanism configured to be coupled with a fuselage of the target aircraft and configured to capture the fitting; wherein the global navigation satellite system receiver is a global positioning system receiver, and wherein the global positioning system receiver comprises: a computer readable storage medium having program instructions embodied thereon; and one or more processors configured to: receive a GPS signal; receive a correction stream; and calculate a location of the global positioning system receiver using the received GPS signal and the received correction stream; wherein the fitting further comprises an inertial measurement unit; wherein the global navigation satellite system antenna comprises one or more controlled reception pattern antennas; wherein the fitting further comprises a wireless communications system; wherein the wireless communications system comprises an RF communications module; wherein the wireless communications system comprises a software-defined radio module; wherein the global navigation satellite system receiver is a global positioning system receiver, and wherein the global positioning system receiver comprises: a computer readable storage medium having program instructions embodied thereon; and one or more processors configured to: receive a GPS signal; and transmit a correction stream for calculating on a roving platform a location of the global positioning system receiver using the roving platform's received GPS signal and the transmitted correction stream.

Also disclosed herein are embodiments of a system for recovery of a target aircraft by a host aircraft, the system comprising: a towline comprising a proximal section configured to be coupled with the host aircraft and a distal section configured to be paid out from the host aircraft; a navigation body coupled with the distal section of the towline a distance away from a distal end of the towline, the navigation body comprising: a housing; a global navigation satellite system receiver; and a global navigation satellite system antenna; a fitting coupled with the distal section of the towline; and a capture mechanism configured to be coupled with a fuselage of the target aircraft and to capture the fitting.

Any embodiments of the devices, systems, and methods disclosed herein can include, in additional embodiments, one or more of the following features, components, and/or details, in any combination with any of the other features, components, and/or details of any other embodiments of the devices, systems, and methods disclosed herein: wherein the navigation body is located between 10 feet and 20 feet away from the distal end of the towline, and wherein the fitting is located at the distal end of the towline; wherein the navigation body further comprises a wireless communications module.

Also disclosed herein are embodiments of a system for recovery of a target aircraft by a host aircraft during flight, the system comprising: a towline comprising a proximal section configured to be coupled with the host aircraft and a distal section configured to be paid out from the host aircraft;

a fitting coupled with the distal section of the towline; and a detector disposed on the target aircraft.

Any embodiments of the devices, systems, and methods disclosed herein can include, in additional embodiments, one or more of the following features, components, and/or details, in any combination with any of the other features, components, and/or details of any other embodiments of the devices, systems, and methods disclosed herein: further comprising: a beacon disposed at a rudder of the host aircraft; a beacon disposed at the fitting; and a beacon disposed at a wing tip of the host aircraft, wherein the detector is a near infrared camera, and wherein the beacons are configured to emit near infrared light; wherein the host aircraft comprises a plurality of fiducial markers, and wherein the detector is an electro-optical camera; further comprising: a radio receiver disposed on the target aircraft; one or more beacons configured to emit near infrared light and disposed on the host aircraft, the fitting, or both; and one or more beacons configured to emit a broadband radio signal and disposed on the host aircraft, the fitting, or both, wherein the detector is a near infrared camera; wherein the detector comprises a LIDAR detector, and wherein the system further comprises a global positioning system receiver capable of real-time kinematics corrections.

Also disclosed herein are embodiments of a method of recovering a target aircraft by a host aircraft during flight, the method comprising: extending from the host aircraft a towline having a fitting comprising a real-time kinematics GPS receiver; determining, by the real-time kinematics GPS receiver, a location of the fitting; transmitting, using a wireless communications module, the location of the fitting to the target aircraft; navigating the target aircraft to a location near the location of the fitting; intercepting, by the target aircraft, the fitting; and securing, by the target aircraft, the towline to the target aircraft.

Any embodiments of the devices, systems, and methods disclosed herein can include, in additional embodiments, one or more of the following features, components, and/or details, in any combination with any of the other features, components, and/or details of any other embodiments of the devices, systems, and methods disclosed herein: wherein the wireless communications module is disposed in the fitting. wherein the wireless communications module is disposed in the host aircraft.

Also disclosed herein are embodiments of a method of recovering a target aircraft by a host aircraft during flight, the method comprising: extending from the host aircraft a towline having a fitting comprising a real-time kinematic capable GPS receiver; transmitting, using a wireless communications module, real-time kinematic data obtained with the real-time kinematic capable GPS receiver to the target aircraft; determining, by a real-time kinematic GPS receiver on the target aircraft, a location of the fitting; navigating the target aircraft to a location near the location of the fitting; intercepting, by the target aircraft, the fitting; and securing, by the target aircraft, the towline to the target aircraft.

Also disclosed herein are embodiments of a method of recovering a target aircraft by a host aircraft during flight, the method comprising: receiving, from a navigation body affixed to a towline, inertial measurement unit data associated with the navigation body and real-time kinematic GPS data associated with the navigation body; receiving, from the target aircraft, inertial measurement unit data associated with the target aircraft and real-time kinematic GPS data associated with the target aircraft; determining, based on the inertial measurement unit data associated with the navigation body and the inertial measurement unit data associated with the target aircraft, a relative location of the target aircraft with respect to the navigation body; and determining, based on the real-time kinematic GPS data associated with the navigation body and the real-time kinematic GPS data associated with the target aircraft, a navigation correction.

Any embodiments of the devices, systems, and methods disclosed herein can include, in additional embodiments, one or more of the following features, components, and/or details, in any combination with any of the other features, components, and/or details of any other embodiments of the devices, systems, and methods disclosed herein: wherein the inertial measurement unit data associated with the navigation body comprises change in velocity data and change in attitude angle data associated with the navigation body, and wherein the inertial measurement unit data associated with the target aircraft comprises change in velocity data and change in attitude angle data associated with the target aircraft; wherein the real-time kinematic GPS data associated with the navigation body comprises pseudo-range data and carrier phase data associated with the navigation body, and wherein the real-time kinematic GPS data associated with the target aircraft comprises pseudo-range data and carrier phase data associated with the target aircraft; wherein a rate of receiving inertial measurement unit data associated with the navigation body is greater than a rate of receiving real-time kinematic data associated with the navigation body; wherein determining the navigation correction comprises determining that real-time kinematic GPS data associated with target aircraft and real-time kinematic GPS data associated with the navigation body are available; wherein determining the navigation correction comprises determining that the real-time kinematic GPS data associated with the target aircraft and the real-time kinematic GPS data associated with the navigation body meet one or more quality criteria; wherein the quality criteria comprise any combination of one or more of a noise level, a number of satellites, or a geometric dispersion of satellites.

Disclosed herein are embodiments of a system for recovery of a target aircraft by a host aircraft. In some embodiments, the system can include a towline that can include a proximal section configured to be coupled with the host aircraft and a distal section configured to be paid out from the host aircraft, a fitting coupled with the distal section of the towline, and a capture mechanism that can be configured to be coupled with a fuselage of the target aircraft and configured to capture the fitting. In some embodiments, the fitting can include a housing, a global navigation satellite system receiver, a global navigation satellite system antenna, and a ballast. In some embodiments, the target aircraft can include a global navigation satellite system receiver and a global navigation satellite system antenna.

In some embodiments, the global navigation satellite system receivers can be global positioning system (GPS) receivers, and the global positioning system receivers can include a computer readable storage medium having program instructions embodied thereon, and one or more processors. The one or more processors can, in some embodiments, be configured to receive a GPS signal, receive a correction stream from a second GPS receiver, and calculate a location of the global positioning system receiver relative to the second GPS receiver using the received GPS signal and the received correction stream. The fitting further can include an inertial measurement unit (IMU). In some embodiments, the global navigation satellite system antenna can include one or more controlled reception pattern antennas. Further, the fitting can include a wireless communications system which can, in some embodiments, include a Wi-Fi communications module, Bluetooth communications module, and/or a software-defined radio module.

Also disclosed herein are embodiments of a system for recovery of a target aircraft by a host aircraft that can, in some embodiments, include a towline that can include a proximal section configured to be coupled with the host aircraft and a distal section configured to be paid out from the host aircraft, a navigation body coupled with the distal section of the towline a distance away from a distal end of the towline, a fitting coupled with the distal section of the towline, and a capture mechanism configured to be coupled with a fuselage of the target aircraft and to capture the fitting. In some embodiments, the navigation body that can include a housing, a global navigation satellite system receiver, and a global navigation satellite system antenna. In some embodiments, the navigation body can be located between 10 feet or about 10 feet and 20 feet or about 20 feet, away from the distal end of the towline, and the fitting can be located at the distal end of the towline. In some embodiments, the fitting and/or navigation body further can include a wireless communications module, which can include any desired or suitable wireless communications components.

Also disclosed herein are embodiments of a system for recovery of a target aircraft by a host aircraft during flight that can, in some embodiments, include a towline that can include a proximal section configured to be coupled with the host aircraft and a distal section configured to be paid out from the host aircraft, a fitting coupled with the distal section of the towline, and a detector disposed on the target aircraft. In some embodiments, the system can further include a beacon disposed at a rudder of the host aircraft, a beacon disposed at the fitting, and a beacon disposed at a wing tip of the host aircraft. The detector can be a near infrared camera, the beacons can be configured to emit near infrared light. In some embodiments, the host aircraft can include a plurality of fiducial markers, and the detector can be an electro-optical camera. In some embodiments, the system can include a radio receiver disposed on the target aircraft, one or more beacons configured to emit near infrared light and disposed on the host aircraft, the fitting, or both, and/or one or more beacons configured to emit a broadband radio signal and disposed on the host aircraft, the fitting, or both. The detector can optionally be a near infrared camera. In some embodiments, the detector can include a LIDAR detector, and the system can further include a global positioning system receiver capable of real-time kinematics corrections.

Also disclosed herein are embodiments of a method of recovering a target aircraft by a host aircraft during flight that, in some embodiments, can include extending from the host aircraft a towline having a fitting that can include a real-time kinematic GPS receiver, determining, by the real-time kinematics GPS receiver, a location of the fitting, transmitting, using a wireless communications module, the location of the fitting to the target aircraft, navigating the target aircraft to a location near the location of the fitting, intercepting, by the target aircraft, the fitting, and securing, by the target aircraft, the towline to the target aircraft. In some embodiments, the wireless communications module can be disposed in the fitting, can be disposed in the host aircraft, or otherwise.

Also disclosed herein are embodiments of a method of recovering a target aircraft by a host aircraft during flight that, in some embodiments, can include extending from the host aircraft a towline having a fitting that can include a GPS receiver and real time kinematic moving base station for calculating measurements needed for real time kinematic relative position resolution from the target aircraft, and transmitting those measurements, using a wireless communications module to the target aircraft, which determines by the real-time kinematic GPS receiver on the target aircraft, the location of the fitting to the target aircraft, navigating the target aircraft to a location near the location of the fitting, intercepting, by the target aircraft, the fitting, and securing, by the target aircraft, the towline to the target aircraft. In some embodiments, the wireless communications module can be disposed in the fitting, can be disposed in the host aircraft, or otherwise.

BRIEF DESCRIPTION OF THE DRAWINGS

The foregoing and other features of the present disclosure will become more fully apparent from the following description and appended claims, taken in conjunction with the accompanying drawings. understanding that these drawings depict only several embodiments in accordance with the disclosure and are not to be considered limiting of its scope, the disclosure will be described with additional specificity and detail through use of the accompanying drawings. In the following detailed description, reference is made to the accompanying drawings, which form a part hereof. In the drawings, similar symbols typically identify similar components, unless context dictates otherwise. The illustrative embodiments described in the detailed description, drawings, and claims are not meant to be limiting. Other embodiments may be utilized, and other changes may be made, without departing from the spirit or scope of the subject matter presented herein. It will be readily understood that the aspects of the present disclosure, as generally described herein, and illustrated in the drawings, may be arranged, substituted, combined, and designed in a wide variety of different configurations, all of which are explicitly contemplated and make part of this disclosure.

DETAILED DESCRIPTION OF SOME EXEMPLIFYING EMBODIMENTS

Figure 1A:
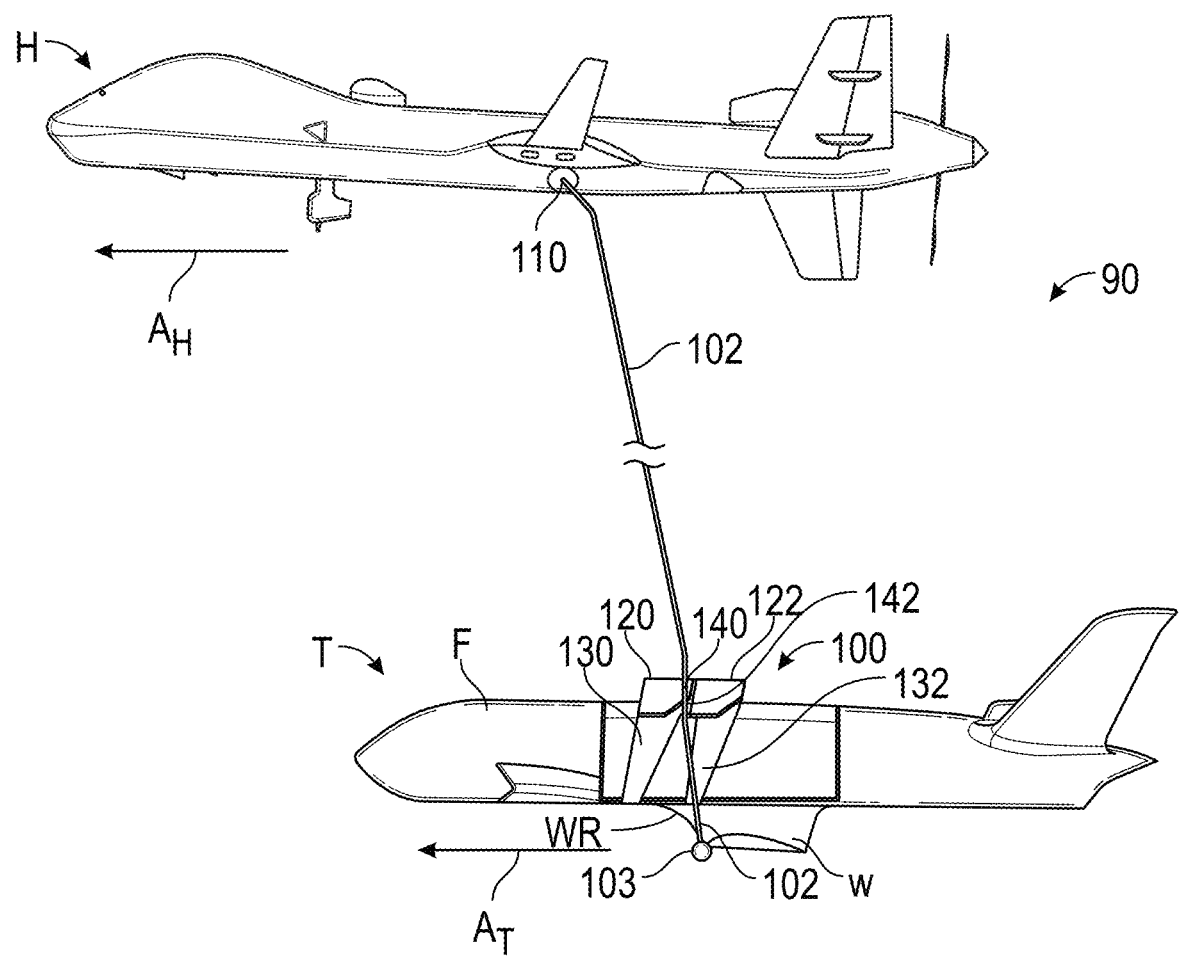
FIG. 1A shows an example embodiment of a recovery system.

The following detailed description is directed to certain specific embodiments of the development. In this description, reference is made to the drawings wherein like parts or steps may be designated with like numerals throughout for clarity. Reference in this specification to "one embodiment," "an embodiment," or "in some embodiments" means that a particular feature, structure, or characteristic described in connection with the embodiment is included in at least one embodiment of the invention. The appearances of the phrases "one embodiment," "an embodiment," or "in some embodiments" in various places in the specification are not necessarily all referring to the same embodiment, nor are separate or alternative embodiments necessarily mutually exclusive of other embodiments. Moreover, various features are described which may be exhibited by some embodiments and not by others. Similarly, various requirements are described which may be requirements for some embodiments but may not be requirements for other embodiments. The headings provided herein are for convenience only and are not necessarily intended to affect the scope or meaning of the claims.

UAV's are aircraft without a human pilot onboard. UAV's may be piloted manually by a remote operator, through autonomous control, and/or through semi-autonomous controls. The remote operator may pilot the UAV using, for example, the UAV's flight cameras, gauges, and other control sensors. UAV's may be used in a number of roles, such as aerial reconnaissance and ground surveillance, monitoring terrestrial objects and/or people, scientific experiments, geological surveys, military or non-military contexts, weapon delivery, and so forth.

Larger aircraft may generally have greater operating ranges than smaller or lighter UAV's. Thus, carrying a UAV on a host aircraft (also referred to herein as a supply aircraft) and launching therefrom may expand the useful range of a UAV. However, safely landing the UAV for terrestrial recovery may be difficult or impossible in certain circumstances. For example, the area may lack a sufficient landing space with suitable geography (e.g., due to the presence of trees, hilly terrain, unstable rocky surfaces, and so forth). In some cases, the UAV may fly over an area under enemy control, rendering terrestrial recovery infeasible. Aerial recovery may be used to recover a UAV in such circumstances. However, aerial recovery can be difficult and/or unreliable.

Small UAV's may have limited range and utility. Recovery using conventional methods such as skid landing and net arrest risks significant damage, which precludes the use of advanced sensors and other equipment that have relatively high costs. Recovery systems and methods that provide for reliable, robust UAV recovery with little risk of damage can extend the utility of UAV's and make it feasible to use advanced sensors and other equipment as the risk of damage or loss can be significantly reduced.

While the above discussion relates primarily to unmanned vehicles, it will be appreciated that the recovery systems and methods described herein are broadly applicable to a wide range of target aircraft, which can be manned or unmanned and which can be controlled autonomously, partially autonomously, manually by a remote pilot, by an onboard pilot, and so forth.

Target aircraft can be recovered using horizontal (or nearly horizontal) towlines in some circumstances. However, horizontal towlines present various challenges. For example, a horizontal towline may need to be weighted to control its shape and may not be able to recover some types of aircraft, such as UAV's that use propellers. According to some embodiments herein, a vertical (or nearly vertical) towline and hoist enables recovery of a broad range of target aircraft with different airframe shapes, different propulsion methods, and different locations of propulsion equipment.

The systems and methods described in the present disclosure enable target aircraft (e.g., small UAV's or other aircraft) to be transported to a mission point via captive carriage by a larger host aircraft equipped with a pod or recovery pylon. The target aircraft, pod, and/or host aircraft can be configured to launch the target aircraft from the host aircraft so that the target aircraft can carry out its mission or a further mission. The target aircraft can then be recovered, if desired, by the host aircraft. After recovery, the target aircraft may be refueled, recharged, rearmed, and so forth before being launched for another mission. In some embodiments, the target aircraft may perform multiple missions without having to return to base. In some embodiments, a target aircraft is deployed and recovered by the same host aircraft. In other embodiments, however, different host aircraft are used for deploying and recovering the target aircraft, thereby enabling the target aircraft to perform missions indefinitely.

A host aircraft may recover a target aircraft by deploying a towline having an end fitting that can be captured by and secured to the target aircraft, for example as described in U.S. patent application Ser. No. 17/455,383, entitled "AIRBORNE RECOVERY OF UNMANNED AERIAL VEHICLES," the contents of which are incorporated by reference herein in their entirety for all purposes and form a part of this specification. Any embodiments of the system for recovery of a target aircraft disclosed herein can have any of the components of any of the embodiments of the system for recovery of a target aircraft disclosed in U.S. patent application Ser. No. 17/455,383, which embodiments are all hereby incorporated by reference as if fully set forth herein, in any combination with any of the components or features of the embodiments of the system for recovery of a target aircraft disclosed herein. For example and without limitation, any embodiments of the target aircraft disclosed herein can have the capture mechanism of any embodiments disclosed in U.S. patent application Ser. No. 17/455,383 and all such embodiments are hereby incorporated by reference as if explicitly described herein.

During in-flight recovery, rearming, recharging, and so forth of target aircraft by a host aircraft, the target aircraft is often guided toward a towline that is captured by the target aircraft. The towline is tethered to the host aircraft and can be paid out and reeled in by the host aircraft. The target aircraft can be manned or unmanned and is generally navigated toward the host aircraft and controlled to be on a similar flight path as compared to the host aircraft to bring the target aircraft into close proximity to the host aircraft. For example, the target aircraft can be navigated toward the host aircraft using proportional navigation techniques known to those of skill in the art and/or as further described herein.

The capture mechanism on the target aircraft can include clamping mechanisms that are designed to capture and clamp to the towline so that the target aircraft can be reeled into the host aircraft for refueling, recharging, servicing, rearming, and so forth, or so that the towline can be used to transfer items from the host aircraft to the target aircraft.

However, when operating at high airspeeds, subject to the impact of high winds, low visibility conditions, and other weather impacts such as rain, hail, snow, and so forth, it can be challenging to navigate the target aircraft close enough to the towline so that the target aircraft can capture the towline. The towline, which can be a stranded steel cable, can also be traveling at a high airspeed and can be subject to the same conditions as the aircraft, resulting in significant and sometimes uncontrollable and/or unpredictable movement of the towline relative to the target aircraft. Thus, there is a need for a relative navigation system that can assist in the capture of the towline by the target aircraft by providing a system with adequate speed, accuracy, and reliability for determining the location of the towline relative to the target aircraft, even in low light, adverse weather conditions, and so forth.

A fitting coupled with the end of the towline can be used to secure the towline to the capture mechanism of the target aircraft. In some embodiments of a relative navigation system, the fitting (which can be an end fitting, such as a drogue) can also include electronic components of a relative navigation system as described herein. The navigational electronics can also be located in other components secured to the towline such as a dedicated electronics housing positioned above or below the fitting, can be located in the host aircraft, and/or can be located in the target aircraft. In some embodiments, the host aircraft and the towline end fitting or other electronics housing coupled with the towline can be equipped with a beacon or other device that can be detected by sensors on the target aircraft. In some embodiments, the host aircraft, end fitting, or other electronics housing coupled with the towline can have navigational equipment (e.g., GPS receivers, cameras, LIDAR sensors, visible emitters, RF emitters, near-infrared emitters, UV emitters, and so forth) whose signals are subsequently sent to the target aircraft either with or without processing.

While various embodiments are possible, in some embodiments, any of the navigational electronics disclosed herein can be disposed inside the end fitting. This can have a benefit of reducing the uncertainty in the position of the end fitting that can occur when measuring or estimating the position of the end fitting using navigational electronics that are located in a separate structure or otherwise outside of the end fitting (e.g., in a host aircraft, etc.). Accordingly, capture success rates of some embodiments can be higher when navigational components are disposed inside the end fitting. However, such an approach presents several challenges, as discussed in more detail below. For example, there can be little space available inside the end fitting, which can make it difficult to fit navigational hardware, communications hardware, and/or other components of the navigational system inside the end fitting, present difficulties delivering signals to and from the electronics inside the fitting (for example, if the end fitting is made of a metal, it can operate as a Faraday shield and block wireless signal transmission), and so forth. In some embodiments, an end fitting may be configured with one or more windows that are transparent or partially transport to electromagnetic waves, or other suitable means may be used to carry signals into and out of the fitting.

Some embodiments of the relative navigation systems disclosed herein can be configured to enable the location of the towline or end fitting with high accuracy (e.g., within 5 cm or approximately 5 cm). In some embodiments, the relative navigation systems disclosed herein can be configured to enable the location of the towline or end fitting within 4 cm or approximately 4 cm, or from 3 cm or less or approximately 3 cm to 10 cm or approximately 10 cm, or from 3 cm or less or approximately 3 cm to 5 cm or approximately 5 cm, or of any values in any of the foregoing ranges or from and to any values within any of the foregoing ranges. For example, some embodiments can determine the relative position of the towline within a few inches of resolution or less and can be configured to update the relative position at a high frequency, which can be important as the towline can move around very quickly in flight. For example and without limitation, some embodiments can be configured to update the relative position at a frequency of 10 Hz, or higher than 10 Hz, or from 8 Hz, approximately 8 Hz, or less than 8 Hz to 15 Hz, approximately 15 Hz, or more than 15 Hz, or from 5 Hz or approximately 5 Hz to 20 Hz or approximately 20 Hz, or of any values in any of the foregoing ranges or from and to any values within any of the foregoing ranges.

The amount of movement of the end fitting and the towline can depend on a variety of factors such as, for example, the shape of the end fitting, the weight of the end fitting, the length of the towline, and so forth. As just one nonlimiting example, an end fitting placed on a towline 50 feet in length can have a standard deviation of about 24 inches over a period of about 6 seconds during flight, where the example value of 24 inches refers to the standard deviation of the radial displacement of the end fitting in severe turbulence. The standard deviation can be much less in light turbulence. The end fitting can also help to define the shape of the towline when deployed, which can be influenced by, for example, the weight and/or aerodynamic properties of the fitting.

In some relative navigation systems, such as those used for aerial refueling, relatively high accuracy can be important as small objects must be aligned (e.g., a fuel line end piece deployed from a refueling aircraft can be aligned with a receptacle on a target aircraft). Often, active control systems associated with a fuel line, end fitting, or the like are used to aid in navigation. Advantageously, the systems and methods described herein can operate without the addition of control surfaces, jets, or other steering or control mechanisms to the end fitting or towline. In some embodiments, the proportional navigation systems and methods described herein can enable relative location determination with sufficient accuracy and speed that active control of the end fitting is not needed. As discussed herein, some embodiments can use a vertical or substantially vertical towline than can be captured by a target aircraft by, for example, navigating the target aircraft toward the towline such that a wing surface intercepts the towline and acts as a guide for moving the towline and end fitting to a capture mechanism of the target aircraft. In such a configuration, the towline can provide relatively large vertical target, while the target aircraft's wing can provide a relatively large horizontal target, both of which can facilitate capture. In some embodiments, the systems, methods, and devices disclosed herein can be used for reliable capture without active control of the end fitting (e.g., without thrusters, movable fins, or other adjustable aerodynamic control surfaces that actively alter the position of the end fitting). Alternatively, in some embodiments, active control of an end feature can be used to improve the stability or predictability of the end feature and/or to aid in navigating a target to an end fitting.

FIG. 1A depicts an example embodiment of a system 90 for airborne or in-flight recovery of a target aircraft T having a capture mechanism 100, using a towline from a host aircraft H. The host aircraft H may be any type of manned or unmanned aircraft, for example a conventional aircraft such as a jet or propeller-driven aircraft, UAV, or other aircraft type. The target aircraft T may be any type of UAV, although the target aircraft T could also be a manned or piloted aircraft in any embodiments disclosed herein. The host H and/or target T may be a forward-flying aircraft. In some embodiments, one or both of the host H and the target T may be in vertical flight. For example, H and/or T may be a helicopter, may be an aircraft configured for vertical takeoff and landing, and so forth. The target aircraft T may be a UAV with a fuselage F, one or more flight surfaces such as wings W, and a propulsion system (e.g., a combustion engine or an electric engine).

The capture mechanism 100 may be configured to capture the towline 102 tethered to the host aircraft H and having an end fitting 103 while traveling in a horizontal (i.e., substantially horizontal) direction, as indicated by the arrow $A_H$, which may be in the same or a similar direction as the direction $A_T$ of the target aircraft T. As used herein, horizontal can include, without limitation, directions perpendicular to the direction of gravity and directions that are approximately perpendicular to the direction of gravity, for example, within 5 degrees or approximately 5 degrees, within 10 degrees or approximately 10 degrees, within 20 degrees or approximately 20 degrees, or within 30 degrees or approximately 30 degrees of horizontal, or from 5 degrees, approximately 5 degrees, or less than 5 degrees to 30 degrees or approximately 30 degrees, or of any value in any of the foregoing ranges or to and from any values in any of the foregoing ranges. The host H and/or the target T may be in horizontal or forward flight. In some embodiments, the host H and/or the target T may be traveling only vertically. In some embodiments, the host H and/or the target T may be traveling both horizontally and vertically. In some embodiments, the host H and/or the target T may be stationary in flight, without substantial horizontal or vertical movement.

The target aircraft T may be any suitable or desired aerial vehicle. For example, the target aircraft T may be a Sparrowhawk Small Unmanned Aircraft System (SUAS), by General Atomics Aeronautical Systems, Inc. In other embodiments, disclosed herein, the target aircraft T may be any suitable or desired vertical lift aircraft, or any other suitable or desired manned or unmanned aircraft. In some embodiments, the host aircraft H may be, for example, an MQ-9, by General Atomics Aeronautical Systems, Inc. The target aircraft T can have a deployed-wing wingspan of between 2 and 75 feet, between 3 and 50 feet, between 4 and 25 feet, or between 5 and 15 feet. The target aircraft T can have a length of between 3 and 50 feet, between 3 and 25 feet, between 3 and 15 feet, or between 3 and 10 feet.

In some embodiments, the host aircraft H can include a hoist 110. The hoist 110 can include a winch. The hoist 110 can be configured to pay out or release the towline 102 and can be configured to reel in the towline 102, which can be done, for example, after the towline 102 has been captured by the target aircraft T. The host aircraft H can tether the target aircraft T and move the target aircraft T toward the host aircraft H. The hoist 110 can be attached to the fuselage and/or to a wing of the host aircraft H. In some embodiments, the hoist 110 can be an electric hoist. In some embodiments, the host aircraft can be equipped with multiple hoists, recovery pylons, and so forth. In some embodiments, hardware associated with aerial recovery can be modular and can be affixed to any suitable host aircraft. In some embodiments, aerial recovery hardware can be in communication with the host aircraft. However, in some embodiments, aerial recovery hardware can operate independently of the host aircraft. For example, the aerial recovery hardware can use the host aircraft to power active components (e.g., a motor for paying out and reeling in a towline). But, in some embodiments, as discussed, the system can be configured such that the host aircraft does not have any components of the relative navigation system, all of which are disposed in the target aircraft, the end fitting, in other housings or enclosures coupled with the towline, and/or otherwise coupled with the towline. In such a modular embodiment, the aerial recovery hardware can be deployed on a variety of suitable aircraft (for example, aircraft that are sufficiently large to capture a target aircraft of interest.

The capture mechanism 100 can include a first movable portion 120 and a second movable portion 122, such as arms or flaps. The first movable portion 120 and the second movable portion 122 can be configured to rotate, slide, or otherwise move between a first stowed position in which the movable portions are in a closed or stowed state, and a second deployed position in which the movable portions are in an open or extended position. FIG. 1A depicts the movable portions 120, 122 in a deployed position.

The towline 102 is shown extended downward with a portion 142 of the towline 102 located between a space 140 defined by the movable portions 120, 122. The towline 102 further can extend through a wing root WR in front of the wing W and adjacent the fuselage F, which can be a region adjacent the aircraft, as further described. A fitting 103 can be disposed on a distal end of the towline 102, which can be at the end of the towline 102 as shown. In some embodiments, there can be some length of the towline 102 extending beyond, e.g., through and beyond, the towline 102. The wing root WR and movable portions 120, 122 can guide the towline 102 into the space 140 to stow the movable portions 120, 122 and thereby capture the fitting 103, as further described. The fitting 103 can be spherical, oblong, or another suitable shape.

The movable portions 120, 122 can be elongated arms or flaps. The movable portions 120, 122 can be made of metal, composite, other suitable materials, or combinations thereof. The movable portions 120, 122 can each have a thickness that is less than a width or average width. The length of each movable portion 120, 122 can be greater than the width and/or the thickness. The movable portions 120, 122 can have a variety of shapes, sizes, and configurations, such as prongs, poles, bars, members, or any other suitable structure for securing the fitting 103 to the target aircraft T.

In some embodiments, the first and/or second movable portions 120, 122 can have a contour that is rounded. The contour of the movable portions 120, 122 can match a contour of the fuselage of the target aircraft T, for example to optimize the aerodynamics of the capture mechanism 100 and the target aircraft T when the first and second movable portions 120, 122 are in the closed position. The movable portions 120, 122 can be configured to reduce the aerodynamic drag of the capture mechanism 100 when the first and second movable portions 120, 122 are in the first and second positions. For example, the movable portions 120, 122 can be made from a thin sheet metal or other rigid material.

The movable portions 120, 122 can move between various positions. In some embodiments, the first and second movable portions 120, 122 can be configured to move independently of one another—e.g., the first movable portion 120 can be moved independently of the second movable portion 122, and the second movable portion 122 can be moved independently of the first movable portion 120. In some embodiments, first and second movable portions 120, 122 can be connected and/or configured to move simultaneously and/or in equal amounts. In some embodiments, there can be three, four, or more movable portions. Further, the movable portions 120, 122 can move to any positions that are between the deployed and stowed positions, such as partially deployed positions, half-deployed positions, etc.

The capture mechanism 100 can have a first recess 130 configured to receive the first movable portion 120 therein when the first movable portion 120 is in the closed position. The capture mechanism 100 can have a second recess 132 configured to receive the second movable portion 122 therein when the second movable portion 122 is in the closed position. The recesses 130, 132 can be different portions of one single, larger recess. The recesses 130, 132 can be openings or spaces in the fuselage F.

The capture mechanism 100 may have or define a cavity. The cavity can be located underneath the stowed movable portions 120, 122. The cavity can be an open or empty space that receives the fitting 103 and part of the towline 102. The movable portions 120, 122 in the stowed positions close over the cavity 131 with the fitting 103 and part of the towline 102 therein to secure to the towline 102 to the target aircraft T. The recesses 130, 132 can form an outer portion of the cavity 131.

The first movable portion 120 can have a straight leading or forward edge and an opposite aft or trailing edge. The first movable portion 120 can have a lower or outer edge at a distal end of the first movable portion 120. The first movable portion 120 can have a rearward edge, which can be angled. The rearward edge can be adjacent to the aft or trailing edge. The rearward edge can extend from the outer edge to the aft edge. The rearward edge can be configured to guide or bias the towline 102 to a space 140 (also referred to as an opening or a gap) between the first and second movable portions 120, 122. The second movable portion 122 can have a leading edge and an opposite, straight aft or trailing edge. An angled forward edge can extend from the leading edge to a lower or outer edge. The angled rearward edge of the first movable portion and the angled forward edge of the second movable portion 122 can face each other and partially define an outer receiving portion of the space 140. The space 140 can thus decrease in width in the direction of the target aircraft T. The straight aft edge of the first movable portion 120 and the straight leading edge of the second movable portion 122 can face each other and partially define an inward securing portion of the space 140. The space 140 can thus have a constant width between the straight aft edge of the first movable portion 120 and the straight leading edge of the second movable portion 122. The towline 102 can be guided into the decreasing width portion of the space 140 and then into the constant width portion of the space 140.

Figure 1B:
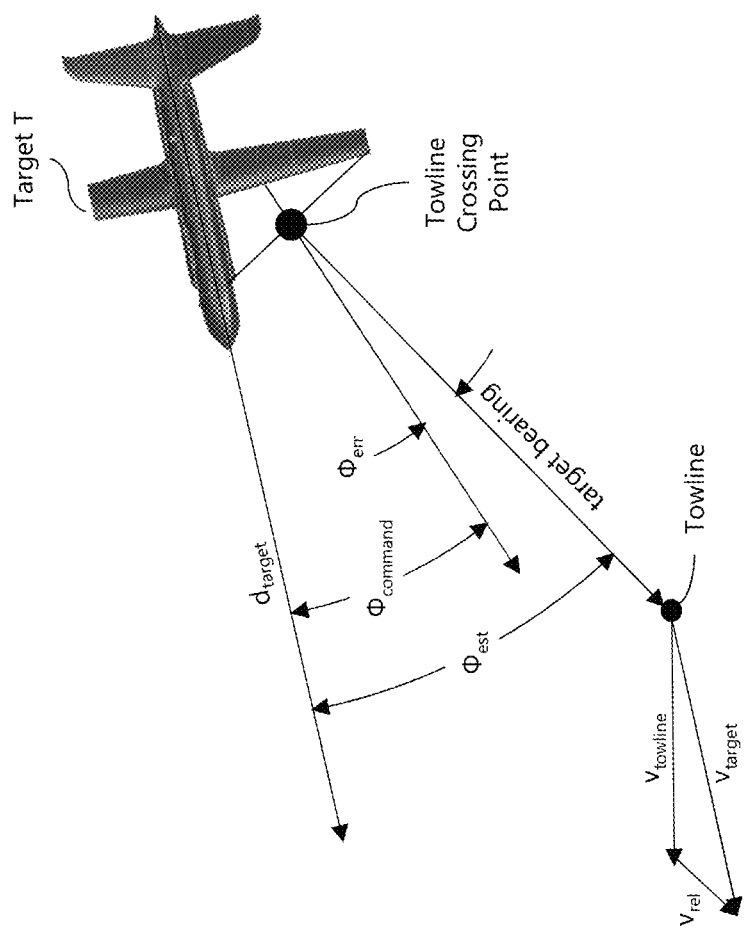
FIG. 1B shows an example embodiment of a recovery approach.

FIG. 1B illustrates a horizontal guidance scheme according to some embodiments. As shown in FIG. 1B, a target aircraft can use the indicated sections of the fuselage and wing to define a catch basket for capturing a towline. The catch basket can include a segment of a wing edge and/or a segment of fuselage that the towline can move along (e.g., slide along) in order to align the towline and fitting with the capture mechanism 100. The target aircraft T can have a velocity $\vec{v}_{target}$ with direction $\vec{d}_{target}$. The towline can have a velocity $\vec{v}_{towline}$. The relative velocity $\vec{v}_{rel}$ of the towline and target can be determined from the difference in $\vec{v}_{target}$ and $\vec{v}_{towline}$. A control system can direct the target aircraft to navigate to the towline by commanding the target aircraft to turn to drive the estimated relative bearing of the towline $\varphi_{est}$ to match the commanded value $\varphi_{command}$, e.g., by commanding the target aircraft to perform a roll maneuver. In some embodiments, an estimated position and/or orientation of the target aircraft at the time of contact with the towline can be used for navigating the target aircraft. The bearing and speed of the target aircraft can be adjusted over time so that the target aircraft changes heading at a desired rate and reaches the towline from a desired direction at a speed that is within acceptable limits. A similar approach can be used for both horizontal and vertical navigation. For example and without limitation, in some embodiments, horizontal navigation may rely predominantly on roll commands to direct the target aircraft, while vertical navigation can rely primarily on vertical acceleration commands. In some embodiments using vertical towlines, the target aircraft can be configured to capture the towline some distance above the end fitting. For example, the target aircraft can be configured to capture the towline 3 feet or about 3 feet, 5 feet or about 5 feet, 10 feet or about 10 feet, or 15 feet or about 15 feet above the end fitting, or at any position between these positions, or more or less as may be desirable.

Figure 1C:
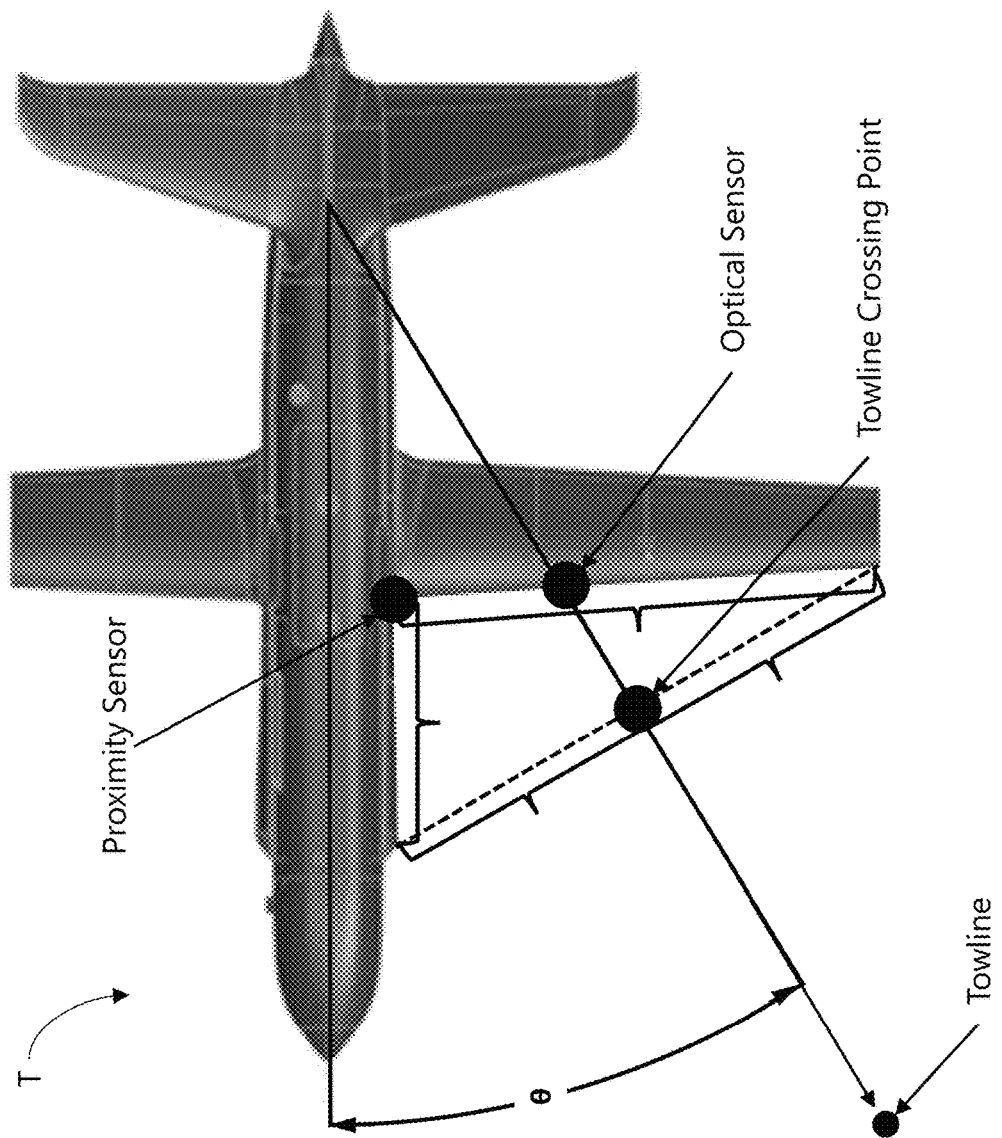
FIG. 1C shows an example embodiment of a recovery approach.

FIG. 1C illustrates a top-down view of an example of an approach according to some embodiments. As shown in FIG. 1C, in some cases the target aircraft T can approach the towline at a relative approach angle θ. The relative approach angle θ can be, for example, from about 0° to about 40°, for example about 15° to about 30°. In some embodiments, the target aircraft can be equipped with one or more sensors for detecting the towline. For example, the target aircraft can have an optical sensor, LIDAR system, etc., mounted on the wing, on the fuselage, or elsewhere on the target aircraft that can detect the relative location and velocity of the towline. In some embodiments, such sensors may not be present, and the target aircraft can navigate using, for example, GPS location data, inertial measurement unit data, and so forth. In some embodiments, the target aircraft can have a proximity sensor disposed at or near the capture mechanism 100 shown in FIG. 1A. In some embodiments, the proximity sensor can be an inductive sensor. For example, the towline can be conductive (or contain conductive portions) that interact with a magnetic field provided by the proximity sensor. Successful recovery of the target aircraft can depend on contacting the towline with sufficient accuracy, which in turn can depend on accurate, high-rate feedback of towline position and velocity relative to the target aircraft. Standard global positioning system (GPS) receivers can determine location to within a few feet, which can be adequate for many purposes but can be unsuitable for in-flight aircraft recovery. This uncertainty in location can make it difficult for the target aircraft to intercept the towline. In some cases, the error in the relative positions of the target aircraft and the end fitting may be significant, and the errors in the positions of both the target aircraft and the end fitting can combine to produce a relatively large uncertainty, which can lead to failed capture attempts. In some cases, failed attempts can result in damage to the target aircraft or the loss of the target aircraft.

Thus, systems and methods are needed for accurately determining the relative location of the target aircraft with respect to the end fitting of the towline. Such systems and methods may enable more reliable recovery of target aircraft.

While some embodiments below describe particular data transmission, receipt, and processing locations, it will be appreciated that, depending upon the specific embodiment, data (e.g., raw data, determined location data, and so forth) can be transmitted from and/or transmitted to the end fitting 103, the host aircraft H, and/or the target aircraft T. Data can be processed by the end fitting 103, the host aircraft H, and/or the target aircraft T. For example, the relative location of the target T and the end fitting 103 can be determined by hardware on the end fitting 103, the host aircraft H, and/or the target aircraft T, so long as the target aircraft T receives information sufficient for navigating to the towline and/or feature such as a drogue, fitting, or navigational body affixed thereto. Depending upon the embodiment, different locations for transmission, processing, and so forth can offer different advantages, such as improved latency, increased computation speed, and so forth, as discussed in more detail below with reference to specific example embodiments.

While reference is made to an end fitting comprising various navigational and/or communications equipment, in general such equipment need not be in the end fitting itself. Rather, the navigational and/or communications equipment can be included in a navigational body on the towline, which may be an end fitting or may be a separate body affixed to the towline.

Real-Time Kinematic—Global Positioning

In some embodiments, a target aircraft can use global navigation satellite system (GNSS) navigation, such as GPS navigation, to aid in guiding the target aircraft to a towline. Advantageously, the GPS system may be configured with functionality to enable real-time kinematic processing, which significantly improves the accuracy of GPS location information. In some embodiments, the RTK GPS components can be military-grade components that have higher resolution, accuracy, and/or reliability than consumer GPS systems. For example, the GPS components can use two GPS frequencies instead of one, which can result in improved performance. In some embodiments, RTK GPS components can be military-grade components that use different or additional signals than consumer GPS systems (e.g., without limitation, military GPS signals). For example, in some embodiments, an RTK GPS receiver can include M-Code support. In some embodiments, an RTK GPS system can include a Selective Availability Anti-Spoofing Module (SAASM).

Typical GPS receivers can be used to determine the location of an object to within a few feet. Errors can arise for a variety of reasons, for example due to errors in the clocks of GPS satellites and GPS receivers, atmospheric effects, and so forth. As discussed briefly above, it may be desirable to have more accurate location information for recovering a target aircraft. In some embodiments, the navigation system can have an accuracy that will allow for the determination of the location of an object (e.g., the end fitting) to within 5 cm or approximately 5 cm. In some embodiments, the navigation system can have an accuracy that will allow for the determination of the location of an object (e.g., the end fitting) to within 1 cm or approximately 1 cm, or within 3 cm or approximately 3 cm, or from 2 cm or less or approximately 2 cm to 10 cm or approximately 10 cm, or from 3 cm or less or approximately 3 cm to 5 cm or approximately 5 cm, or within any of the values or ranges discussed above or of any values in any of the foregoing ranges or from and to any values within any of the foregoing ranges. In some embodiments, differential carrier phase positioning can be used. In some embodiments, the system can be configured for real-time kinematic (RTK) positioning. RTK positioning can use at least one roving receiver on a roving platform and at least one reference receiver that is within a threshold distance of the roving receiver(s). In some embodiments, the reference receiver can be used to provide its own pseudorange and/or carrier phase measurements as part of a correction stream to the roving receiver(s). In some embodiments, the reference receiver can itself be moving. In some embodiments, the reference receiver can have a known position, thereby enabling a more accurate determination of the location of the mobile receiver. Any error in the location of the reference receiver may result in a corresponding error in the location of the mobile receiver. However, this error may be of little or no consequence for navigational systems for in-flight aircraft recovery that rely on relative positioning of target and host aircraft (as opposed to absolute position). In some embodiments, the location of the reference receiver can be unknown. In some embodiments, one reference receiver can be used, while in other embodiments, multiple reference receivers can be used. The reference receivers can share data over a network connection or data link, for example a wireless or wired connection. In some embodiments, one roving receiver can be used, while in other embodiments, multiple roving receivers can be used and can be used to determine relative location information of all the roving receivers from the reference receiver. In some embodiments, roving receivers can share data over a network connection or data link, such as a wired or wireless connection.

Typically, a GPS receiver will receive signals from a plurality of GPS satellites. The signals received by the reference receiver and the roving receiver can be compared (e.g., differenced) so that errors can be removed, resulting in more accurate relative location determination. In some embodiments, some effects such as atmospheric effects can be neglected if the reference receiver is sufficiently close to the roving receiver, as the effects are likely to be similar for nearby receivers.

Figure 2:
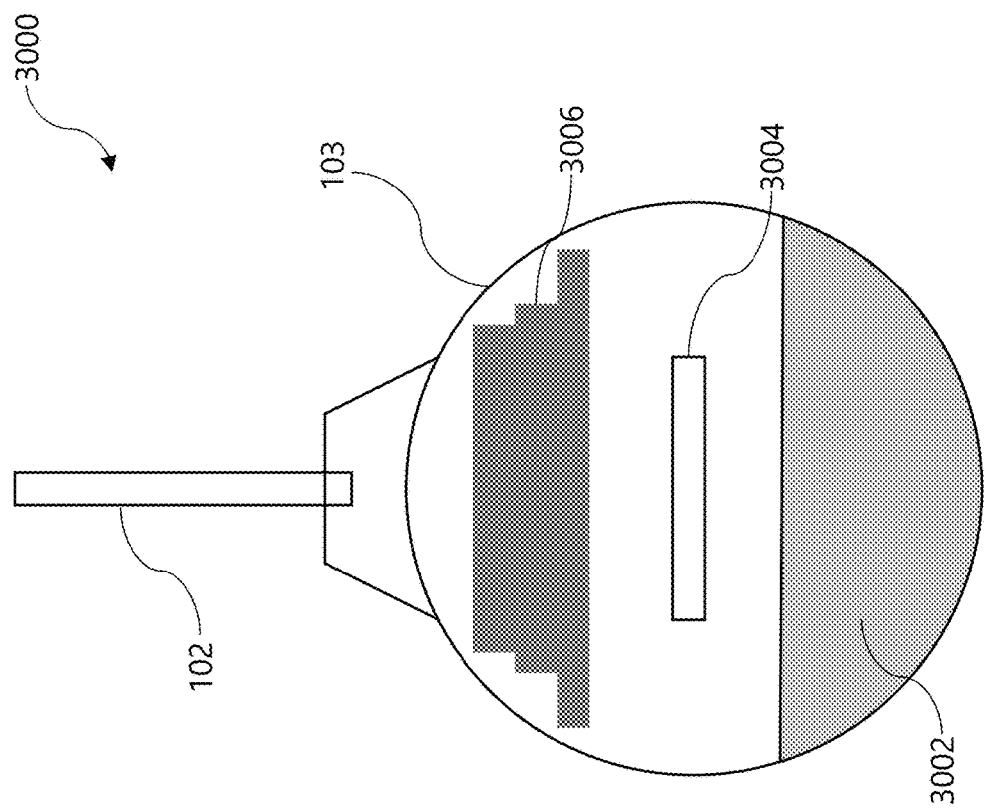
FIG. 2 shows an example illustration of an end fitting according to some embodiments.

FIG. 2 depicts an example embodiment of a relative navigation system 3000 including an end fitting 103 according to some embodiments. The end fitting 103 can include ballast material 3002, RTK-capable GPS receiver 3004, and GPS antenna 3006. In some embodiments, a ballast material may not be included. The RTK-capable GPS receiver 3004 can be configured to generate measurements of pseudorange, carrier phase, or both from various GPS satellites. The end fitting 103 can be coupled with a towline 102 that is mechanically coupled to a host aircraft. Preferably, the end fitting is relatively small, for example having a diameter of 2.5 inches or approximately 2.5 inches or less, 4 inches or approximately 4 inches or less, 6 inches or approximately 6 inches or less, 10 inches or approximately 10 inches or less, or more. Larger end fitting sizes allow more hardware to be included inside the end fitting 103 and can make capture by a target aircraft easier, but a larger end fitting consumes more space inside the target aircraft once the end fitting is engaged with the capture mechanism of the target aircraft, which typically has limited available space. In some embodiments, an optimal size of the end fitting can be 3 inches or approximately 3 inches, or 4 inches or approximately 4 inches, or from 3 inches or approximately 3 inches to 4 inches or approximately 4 inches. In some embodiments, the end fitting can include one or more windows or other features that can enable GPS and/or communications signals to pass through the end fitting.

In some embodiments, the end fitting 103 can include additional hardware. For example, in some embodiments, the end fitting can be equipped with communications equipment for transmitting an RTK-capable GPS receiver's location (or information for determining location) to a target aircraft, host aircraft, and so forth. In some embodiments, the towline 102 can include cables or wiring for transmitting signals and/or power to and/or from the components of relative navigation system 3000. In some embodiments, the components of the relative navigation system may not be connected via wired connections. In some embodiments, the relative navigation system 3000 can be configured for wireless communication. The end fitting can be outfitted with communications hardware that enables direct (e.g., wireless) communication with the target aircraft. In some embodiments, the RTK-capable GPS receiver can include an integrated data link (e.g., a Bluetooth module, RF module, WiFi module, and/or the like), or a data link can be provided by a separate communications hardware component. In some embodiments, the end fitting 103 can include a software-defined radio module. The electronics inside the end fitting can be powered by a battery inside the end fitting and/or by the host aircraft, for example via the towline.

Direct communication between the end fitting and the target aircraft can reduce latency compared to transmitting through communications equipment onboard the host aircraft but can introduce complexity with regard to managing RF interference. Alternatively or additionally, the end fitting can be equipped with hardware for communicating with the host aircraft, which can be wired or wireless, and the host aircraft can communicate with the target aircraft. In some embodiments, the towline can carry signals between the end fitting and the host aircraft.

In some embodiments, the relative navigation system may not rely on electronics on board the host aircraft. In some embodiments, an aerial recovery system can be modular. For example, hardware for capturing a target aircraft can be fitted to any suitable host aircraft, without needing to interface with electronics on board to host aircraft in order to facilitate aerial recovery of target aircraft.

Figure 3:
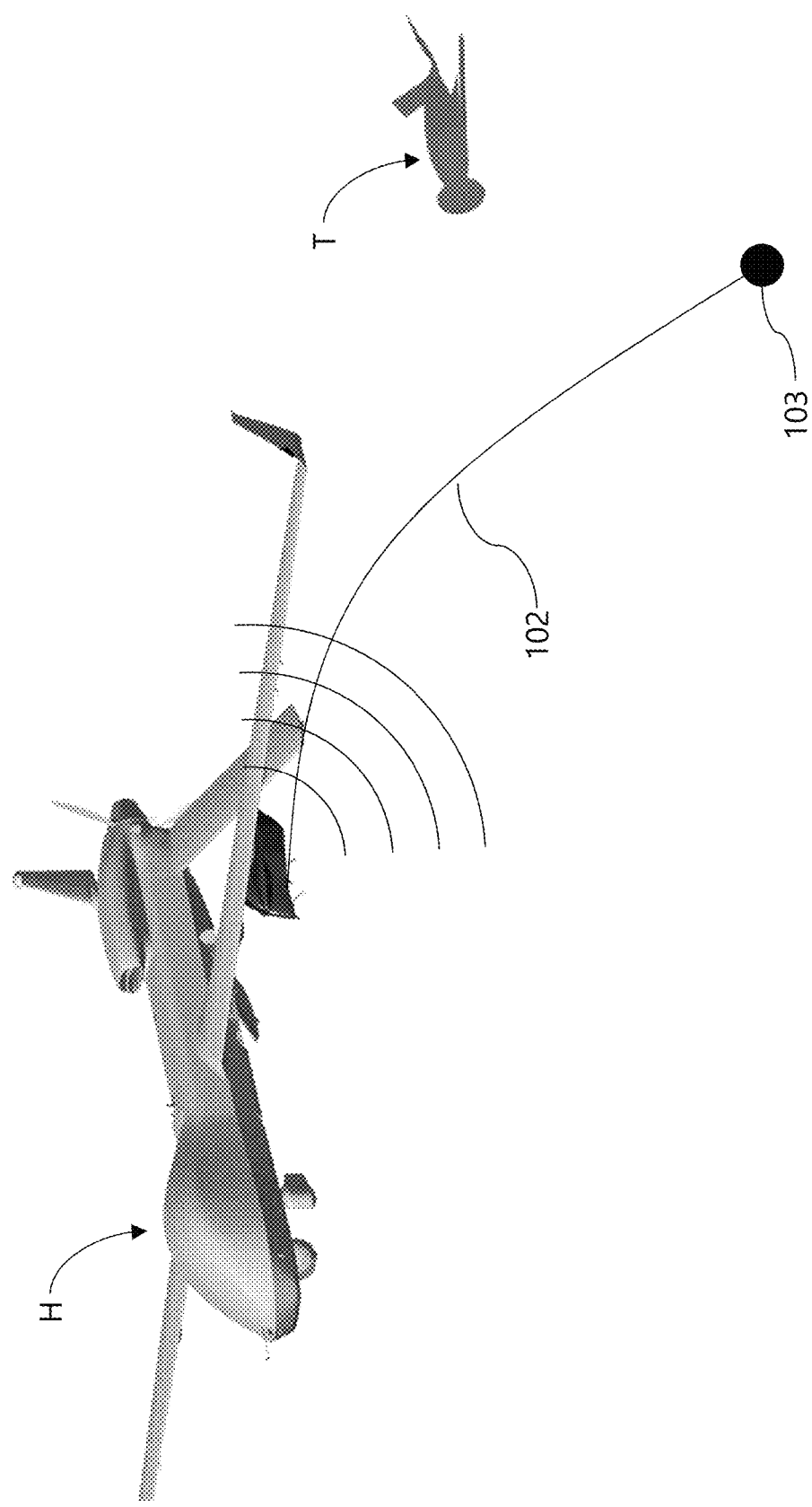
FIGS. 3, 4A, and 4B are example illustrations of RTK-GPS navigation systems according to some embodiments.

FIG. 3 illustrates an example embodiment in which an end fitting 103 is affixed to the end of a towline 102. The end fitting 103 can be configured to transmit a signal to the host aircraft H, for example via a wireless connection or using the towline 102. The host aircraft H can transmit the location of the end fitting 103 to the target aircraft T. As shown in FIG. 3, the signal emitted by H can be directional. Other configurations are possible. For example, the signal can be emitted omnidirectionally, substantially downward from the host H, substantially rearward of the host H, and so forth. In some embodiments, the end fitting 103 can be configured to transmit the location of the end fitting 103 directly to the target aircraft.

The approach depicted in FIG. 3 can have several advantages. For example, the end fitting 103 can be configured with less hardware, less powerful hardware, or both. For example, computing tasks such as determining absolute positions, relative positions, or both can be performed on the host aircraft H. In some embodiments, computing tasks can be performed on a relative navigation computer in a target aircraft. However, in some embodiments, the target aircraft may not be equipped with a relative navigation computer (for example due to space or power constraints). Communication tasks such as communicating with a target aircraft can be offloaded to hardware on board the host aircraft. Offloading computational and communications tasks to the host aircraft may be particularly advantageous when there are significant demands that are poorly suited to the relatively compact hardware in the end fitting 103, when the end fitting components are battery-powered, and so forth. However, reliance on the host aircraft for computation, communication, or both can result in delays determining and transmitting location information to the target aircraft T.

Figure 4A:
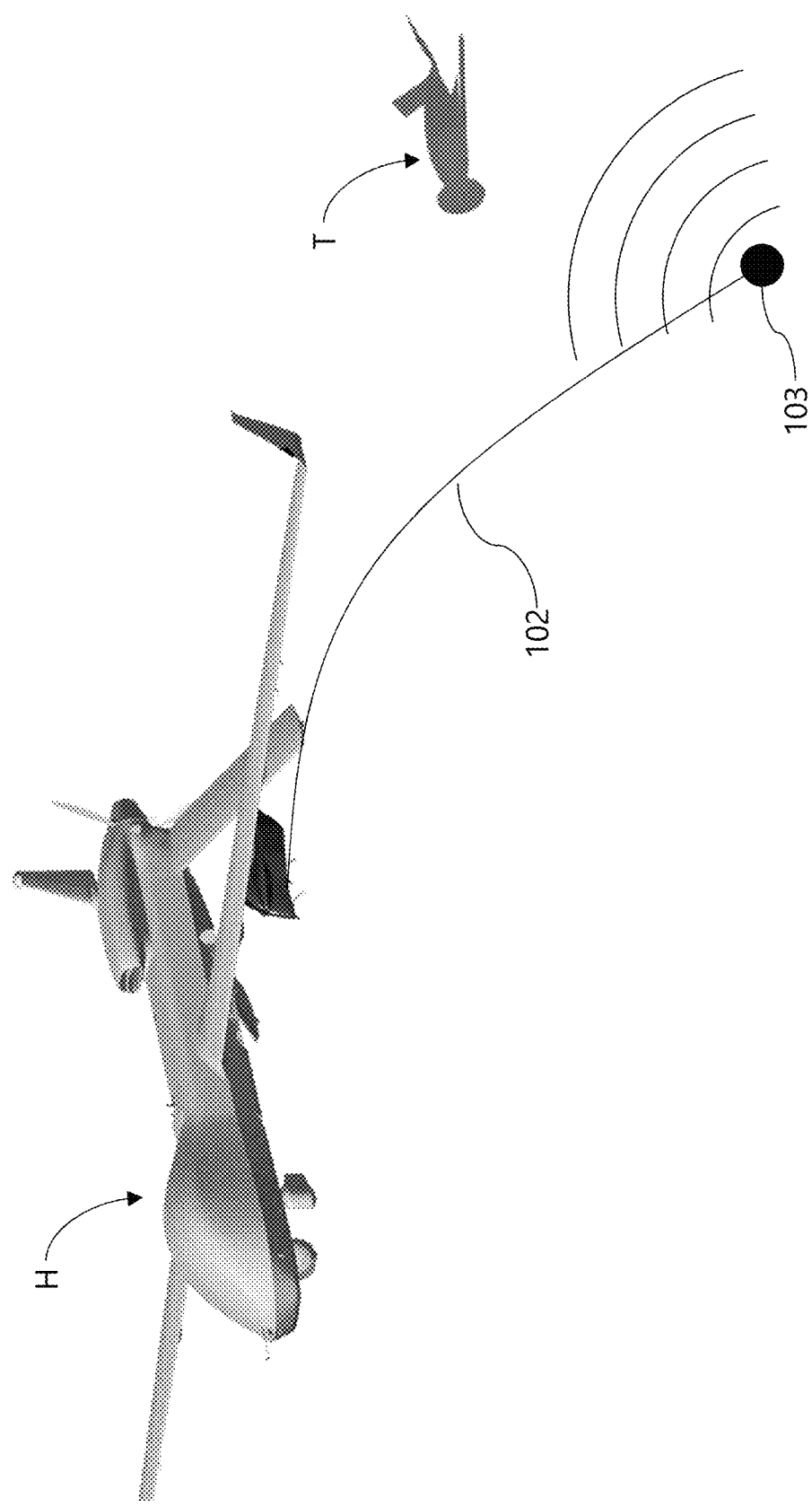

FIG. 4A illustrates an example embodiment in which an end fitting 103 is affixed to the end of a towline 102. In contrast to FIG. 3, the end fitting 103 can include hardware for wirelessly transmitting location information directly to the target aircraft T. The signal emitted from the end fitting 103 can be directional (e.g., generally in the direction of the target T), omnidirectional, substantially upward, substantially rearward, and so forth. It can be advantageous to emit the signal over a wider range of directions to increase the likelihood that the target T receives the signal from the end fitting 103 even when the end fitting is undergoing substantial motion.

Figure 4B:
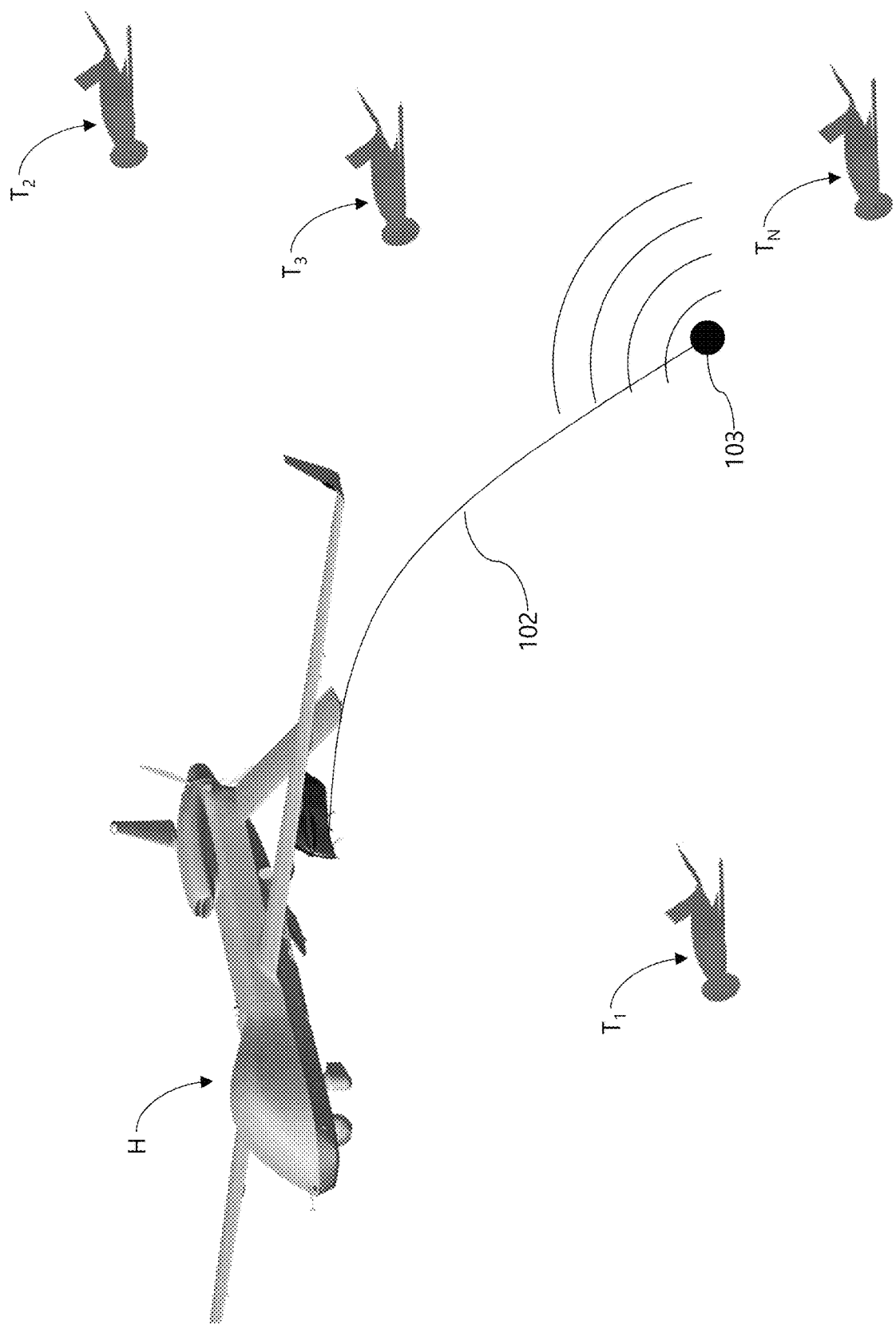

While FIG. 4A shows a single target aircraft, other embodiments are possible. For example, as shown in FIG. 4B, there can be multiple roving systems (e.g., host aircraft, target aircraft). For example, in one configuration, a single fitting 103 can be used to capture a plurality of target aircraft $T_1$ through $T_N$ by a single host aircraft H. In some embodiments, some or all of the roving systems can include communications hardware to enable the roving components to manage their relative locations with respect to each other, which may be especially important when there are, for example, multiple target aircraft waiting to be captured. FIG. 4A illustrates an embodiment in which a single host aircraft H has a single towline and associated capture hardware. However, in some embodiments, as discussed above, multiple towlines and hoists can be installed on the host aircraft.

In general, the fitting 103 can include an RTK-capable GPS receiver as described above. The fitting 103 can include a network interface or data link device configured to broadcast location measurement data including (e.g., pseudo-range, carrier phase, and/or other data that can be used for navigating a target aircraft to an end fitting). Each roving system can include an RTK GPS receiver for generating pseudo-range and carrier phase measurements for each roving system. Each roving system can include a network interface or data link device that can be configured to receive location measurement data from the fitting 103 (e.g., from the data link device of the fitting 103). Each roving system (e.g., target aircraft) can provide its own location measurement data and the received location measurement data of the fitting to an RTK processor. In some embodiments, the RTK processor can be built into the RTK GPS receiver system of the roving system. In some embodiments, the RTK processor can be a separate hardware unit. In some embodiments, the RTK processor may not be a separate hardware component, but may instead be another system, such as a flight computer on board the target aircraft or other roving system. The RTK processor can be configured to take the differences and double differences of the roving system's location measurement data and the fitting's location measurement data, according to techniques known to those of skill in the art. The RTK processor can be configured to perform calculations and estimate the relative position of the roving system (e.g., target aircraft) with respect to the fitting. In the case where the roving system is a target aircraft, the target aircraft can use the relative position for navigating to the fitting. In some embodiments, the target aircraft can use the estimated relative position derived from the location information as a guidance error (e.g., an error in location as determined using other guidance data), which can feed into an aircraft control system to remove the error and thereby aid in navigating the aircraft to the fitting. Such an embodiment is described in more detail with reference to FIG. 5B below. It will be appreciated that other embodiments are possible. For example, an alternative approach is discussed below with reference to FIG. 5A.

In some embodiments, a navigation system can include an inertial measurement unit (IMU). The inertial measurement unit can be used to determine acceleration and/or rotations, for example using accelerometers and/or gyroscopes. In some embodiments, the navigation system can include at least one magnetometer or other sensor that can be used in determining absolute orientation (e.g., orientation with respect to earth). An IMU may offer several advantages over an embodiment that relies solely on GPS information. For example, RTK GPS requires the use of a minimum number of GPS satellites with a minimum geometric dispersion, which may at times be unavailable. Without an inertial measurement unit, navigation can be performed by dead reckoning, which can rely on estimated velocity. While this can be used for short periods, there are significant drawbacks. For example, a constant relative velocity may be assumed. Such an assumption can be problematic for aircraft, which can experience altered speed or direction as a result of active control of the aircraft and/or as a result of atmospheric conditions such as wind and variations in air density.

By using an IMU, smaller positional errors can be maintained during signal outages, longer coasting periods (e.g., periods without GPS data) can be maintained, a slower rate for GPS measurements can be used, and so forth. A slower rate for GPS measurements can free up data link bandwidth, which can be limited. Reducing the bandwidth used for navigating an individual target aircraft can be especially advantageous when there are many roving systems and data link bandwidth may be in greater demand.

A fitting (e.g., fitting 103) can include an inertial measurement unit configured to generate measurements of change in velocity and change in attitude angle. The inertial measurement unit data can be transmitted over a data link to one or more roving systems. In some embodiments, the rate of inertial measurement unit data can be greater than a rate of GPS measurement data. For example, in some embodiments, GPS measurement data can update at a rate of about 10 Hz or more, and the IMU can provide measurement data at a rate that is greater than the rate of the GPS measurement data. The IMU data can be used to estimate position in between RTK GPS updates. Each roving system can also be equipped with an inertial measurement unit configured to generate change in velocity and change in attitude angle measurements. A relative navigation processor of the roving system can receive inertial measurement unit data from the fitting and from the roving system to generate data for relative navigation of the roving system to the fitting. The relative navigation processor of the roving system can be configured to use RTK GPS measurements when available to correct the inertial measurement unit-based navigation data. Accordingly, such an embodiment can achieve RTK GPS-level accuracy even though there may be periods when RTK GPS is unavailable.

In some embodiments, roving systems can navigate primarily using GPS information, which can include RTK information (e.g., an RTK correction stream). In some embodiments, both the roving system (e.g., target aircraft T) and the end fitting can be equipped with RTK GPS receivers. At times, one or both of the roving system (e.g., target T) and the end fitting can lose reception. For example, reception may be lost due to atmospheric disturbances, radio frequency interference, or other impediments that prevent the target T and/or the end fitting from receiving GPS signals. When GPS signals are lost, the target T, the end fitting, or both can use data from inertial measurement units included onboard the target T and/or the end fitting, respectively, to track location. Depending on the stability of the inertial measurement unit, it can be possible to track the location of the end fitting and/or the target T for several seconds, several minutes, or even several hours without an RTK GPS signal with some embodiments of the relative navigation system 3000 disclosed herein. In some cases, the RTK GPS signal may not be lost, but may be otherwise unusable, thus benefitting from the use of an inertial measurement unit. For example, other RF emitters (such as emitters used for television broadcasting, aviation communication, and VHF marine communication) can interfere with GPS signals. In some embodiments, the GPS signal may not be lost, but the RTK correction stream may be corrupted or inaccessible, for example due to an interruption in a network connection used for receiving an RTK correction stream.

Figure 5A:
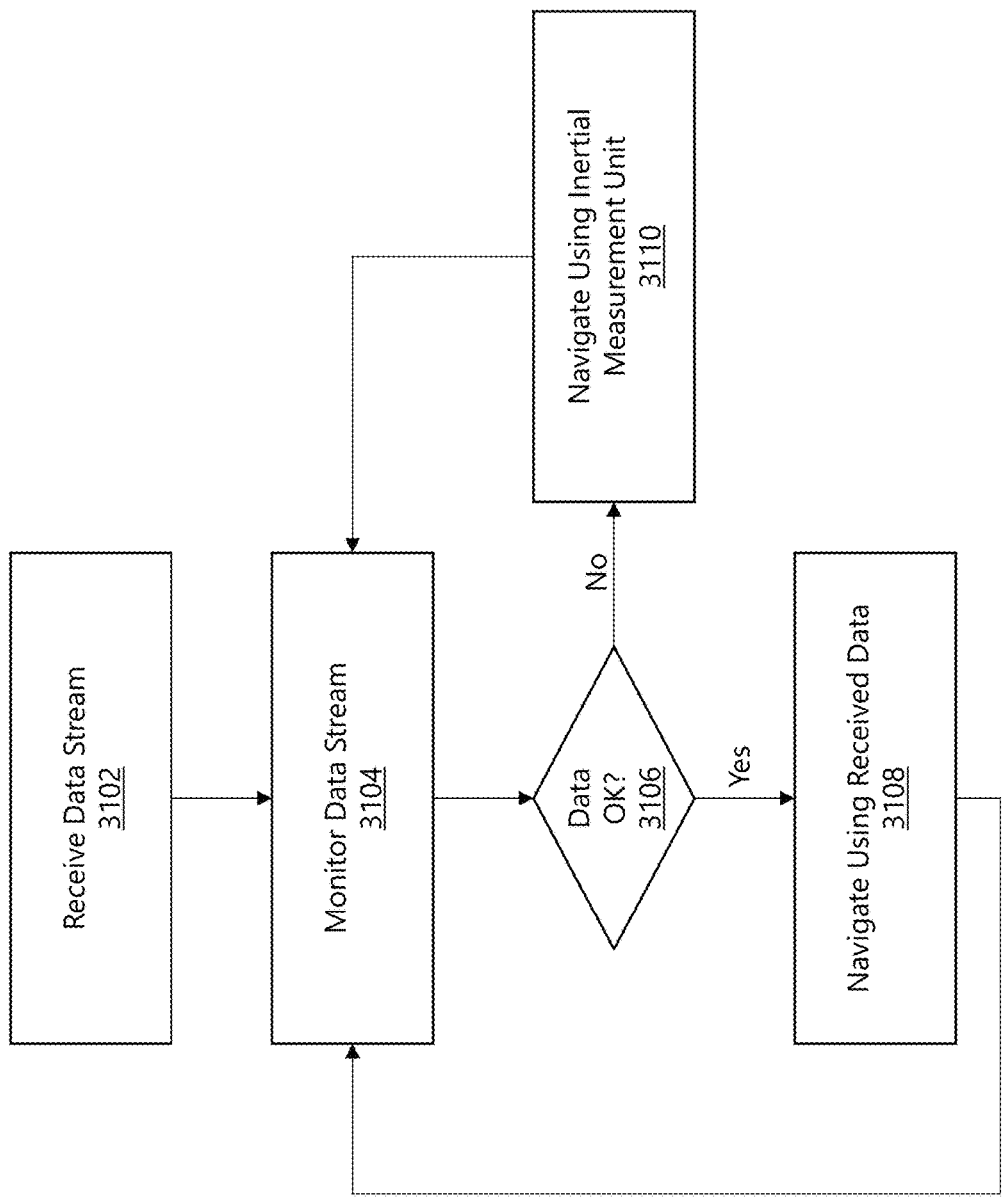
FIGS. 5A and 5B are block diagrams depicting example processes for relative navigation according to some embodiments.

FIG. 5A is an example flowchart of a process for navigating a roving system (e.g., target aircraft) using a received data stream and an inertial measurement unit. As described in this application, the received data stream can comprise RTK GPS data (which itself can comprise a correction stream, pseudo-range data, and/or data received from one or more GPS satellites). However, the general process of FIG. 5A can be used with other navigation methods described herein such that inertial measurement unit data is used for navigation when other navigational information is unavailable, unreliable, and so forth. FIG. 5A illustrates one example embodiment of a process for navigating. Other embodiments can include more or fewer steps, or steps can be carried out in a different order.

At block 3102, a system, which can include a relative navigation processor, can receive a data stream. The data stream can be RTK GPS data, visual data from a camera, detector data from near infrared (NIR) detectors, and so forth. For example, as described above, the data stream can include location measurement data (e.g., RTK GPS data) of a fitting or navigational body affixed to a towline and location measurement data (e.g., RTK GPS data) of the roving system. In some embodiments, the location measurement data can be used to compute relative positioning at block 3102, although in other cases, relative positioning can be determined later, for example prior to applying corrections at block 3112. The received data stream can comprise multiple types of data. For example, the data stream can include both RTK GPS data and IMU data from an end fitting or other navigation body. At block 3104, the system can process the received data to determine if the data quality is acceptable (or if the data is missing). Monitoring can include, for example, a comparison to previous data (for example, to determine if a change in position is beyond a threshold amount) and other measurements and/or analysis to determine if the data should be relied on for navigation. In some embodiments, the received data can be compared with data from the inertial measurement unit to determine if the received data is consistent with the movements observed by the inertial measurement unit. At decision point 3106, if the system determines that the data meets one or more quality criteria (for example, by considering noise levels in received GPS signals, number of satellites in view, geometric dispersion of satellites, and so forth), the system can use the received data for navigation at block 3108. If, instead, at decision point 3106, the received data is not acceptable for navigation, the system can, at block 3110, use data from an inertial measurement unit for navigation. In either case, the system can be configured to monitor the received data and make repeated decisions about whether to use the received data for navigation or not. In some embodiments, positions determined using RTK GPS data can be treated as true, as RTK GPS data can be more reliable than IMU data, which can drift over time. In some embodiments, the system can be configured to evaluate the data stream continuously, while in other embodiments, the system can be configured to evaluate the data stream periodically, for example every 0.001 s, 0.01 s, 0.1 s, 1 s, 2 s, 3 s, 4 s, 5 s, 10 s, and so forth, or based on an amount of data received.

Various reference points can be used for calculating relative positions. For example, in some embodiments, the target aircraft can be the reference point and the position of the fitting or navigational body can be determined relative to the target aircraft. In some embodiments, the fitting or navigational body can be the reference point and the position of the target aircraft with respect to the fitting or navigational body can be determined. In some embodiments, other reference points can be used, such as the location of the host aircraft, the location of a wing root of the target aircraft, and so forth. For some types of aircraft (e.g., tractor props, flying wings, and so forth), the specific reference point can be a different airframe feature or could be the capture device itself. In some embodiments, the location of the capture mechanism on the target aircraft can be used as a reference point. In some embodiments, a position on the towline (e.g., a distance above the end fitting) can be used as a reference point.

Figure 5B:
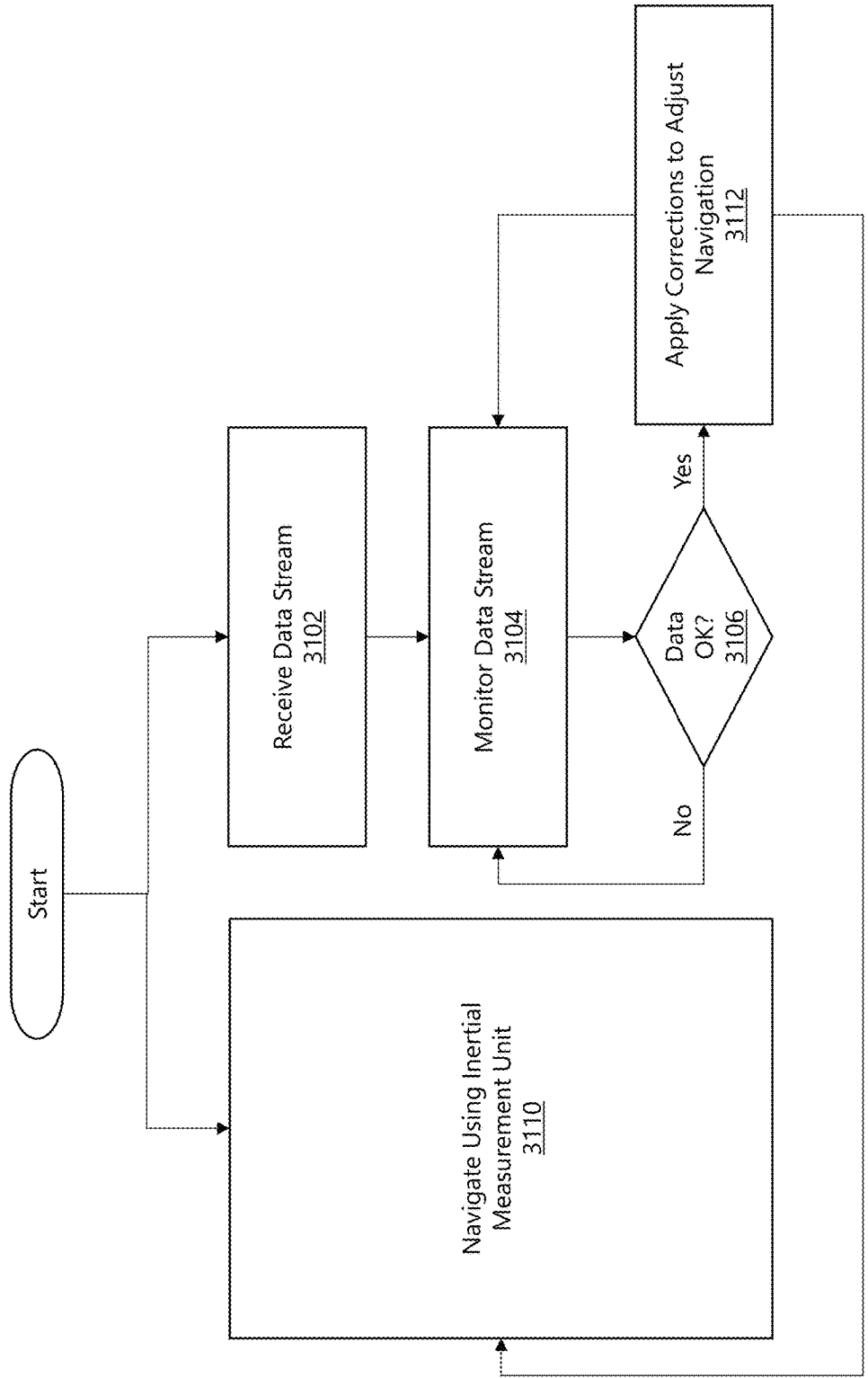

FIG. 5B is an example flowchart of another process for navigating using a received data stream and an inertial measurement unit. As shown in FIG. 5B, a system can primarily navigate using an inertial measurement unit at block 3110. Simultaneously (e.g., at substantially the same time), the system can receive a data stream as discussed above. The system can, at block 3104, monitor the data stream and determine if the data is acceptable for navigation. At decision point 3106, if the data is not acceptable, the system can continue monitoring the data stream at block 3104 and navigating using the inertial measurement unit at block 3110. If, at decision point 3106, the data is acceptable, the system can apply corrections to adjust the navigation of the aircraft at block 3112 and can continue navigating using the inertial measurement unit at block 3110. The system can be configured to monitor the received data and make repeated decisions about whether to use the received data for navigation and whether to apply correction. In some embodiments, the system can be configured to evaluate the data stream continuously, while in other embodiments, the system can be configured to evaluate the data stream periodically, for example every 0.001 s, 0.01 s, 0.1 s, 1 s, 2 s, 3 s, 4 s, 5 s, 10 s, and so forth, or based on an amount of data received or distance traveled. As discussed above with respect to FIG. 5A, various reference points can be used in determining the relative positioning of the target and fitting.

Host and target aircraft can sometimes be deployed in hostile areas. Thus, there is a need to ensure that the navigation system remains operational even when countermeasures such as jamming are used. Thus, in some embodiments, controlled reception pattern antennas (CRPA's) can be used for the GPS receiver. Typically, CRPA's contain a plurality of antenna elements (e.g., 2 elements, 3 elements, 4 elements, 5 elements, 6 elements, 7 elements, or more) and thus are typically larger than standard GPS antennas. CRPA's can effectively create a spatial filter, such that a jamming signal, which can often come from a ground-based source, for example, can be attenuated relative to real GPS signals that arrive from satellites. CRPA's can also be useful in other settings, for example in areas where there is a large amount of RF activity that can interfere with GPS signals. It can be advantageous to use beam-forming technology to effectively filter out RF sources that are known not to originate from the direction of the GPS satellites (e.g., ground-based sources).

Figure 6:
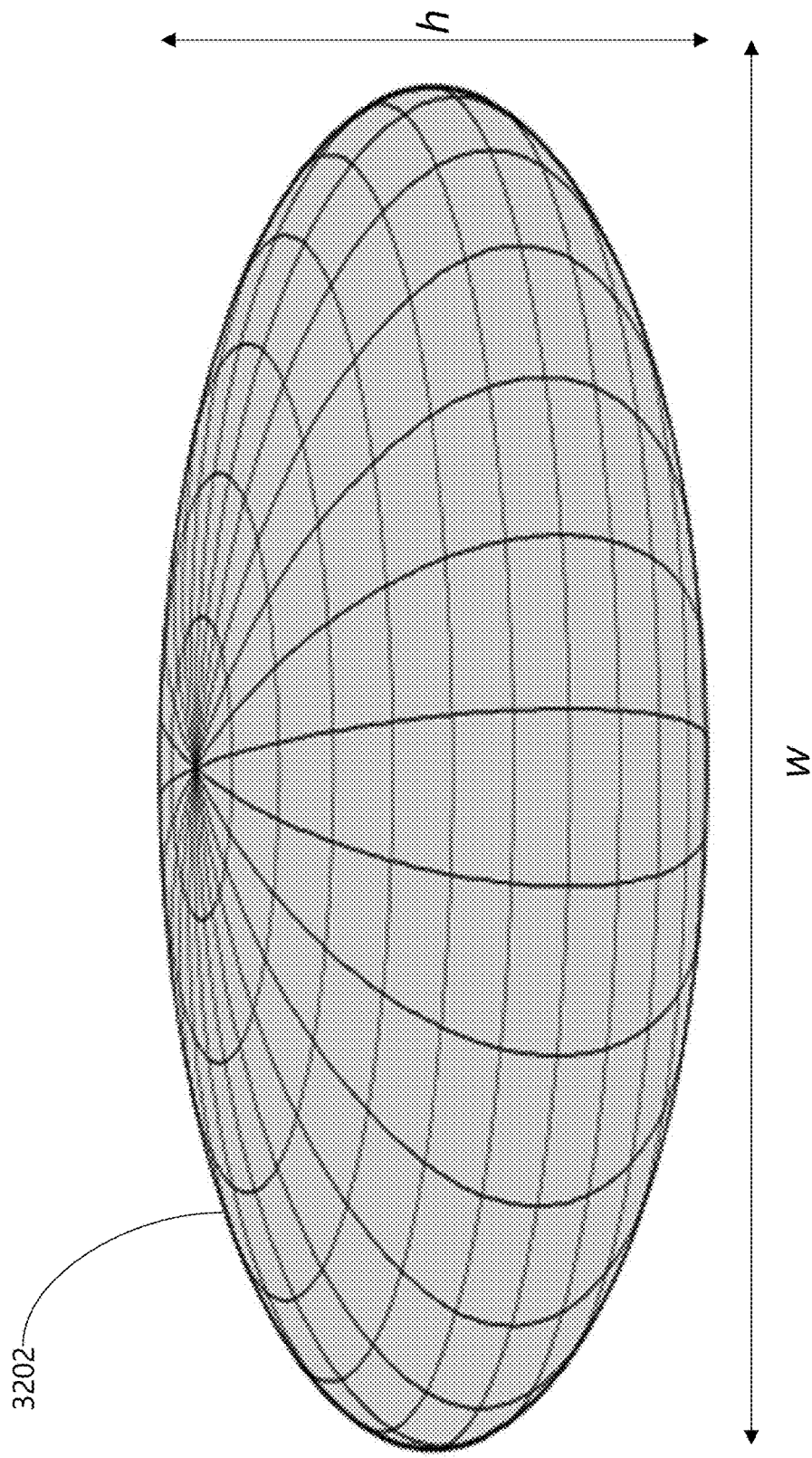
FIG. 6 is an example end fitting according to some embodiments.

FIG. 6 depicts an example end fitting 3202 according to some embodiments herein. In some embodiments, the end fitting 3202 can have a shape of an ellipsoid or similar to that of an ellipsoid with a height h and a width w. The width w can be substantially greater than the height h, and the additional internal volume compared with a sphere of diameter h can be used to house additional electronics components. For example, a CRPA antenna array can have a major dimension of about 5" or more, and thus the end fitting volume can be increased to accommodate the CRPA. Other hardware can also take advantage of increased space inside the end fitting. An ellipsoid shape can also provide additional space for components inside the end fitting without unnecessarily increasing the overall volume of the end fitting, thereby ensuring that the end fitting can still be used for capturing small target aircraft where internal space is limited.

As discussed above, electronics for relative navigation (e.g., without limitation, RTK GPS equipment) can be located inside an end fitting attached at or near the end of a towline. In some embodiments, however, the relative navigation hardware is located in a navigation body attached to the towline. A reel system on a host aircraft can be configured to manage the navigation body during reel in and reel out processes. The navigation body can be larger than the end fitting and can be located on the towline outside of a capture region (e.g., outside a region of the towline that might come into the contact with a target aircraft during an in-flight recovery procedure), for example 5 feet or approximately 5 feet, 10 feet or approximately 10 feet, 12 feet or approximately 12 feet, 14 feet or approximately 14 feet, or 20 feet or approximately 20 feet above the end fitting, or from 5 feet, approximately 5 feet, or less than 5 feet to 20 feet, approximately 20 feet, or more than 20 feet, or from 10 feet, approximately 10 feet to 20 feet, approximately 20 feet, or more than 20 feet, or any value within any of the foregoing ranges or from and to any values within any of the foregoing ranges. In some embodiments, the position of the navigation body may provide a more accurate determination of the location of the end fitting when the navigation body is relatively close to the end fitting, but there may be an increased risk that the navigation body undesirably physically interacts with the target aircraft during recovery of the target aircraft. While locating the navigation body some distance away from the end fitting can reduce the accuracy of the determined location of the end fitting, this will not necessarily substantially impact capture. For example, capture of the target aircraft may be successful as long as a front edge of a wing of the target aircraft intercepts a portion of the towline between the navigation body and the end fitting. That is, the front edge of the wing can act as a guide for directing the towline and end fitting toward a capture mechanism (e.g., the capture mechanism 100 shown in FIG. 1A).

Figure 7:
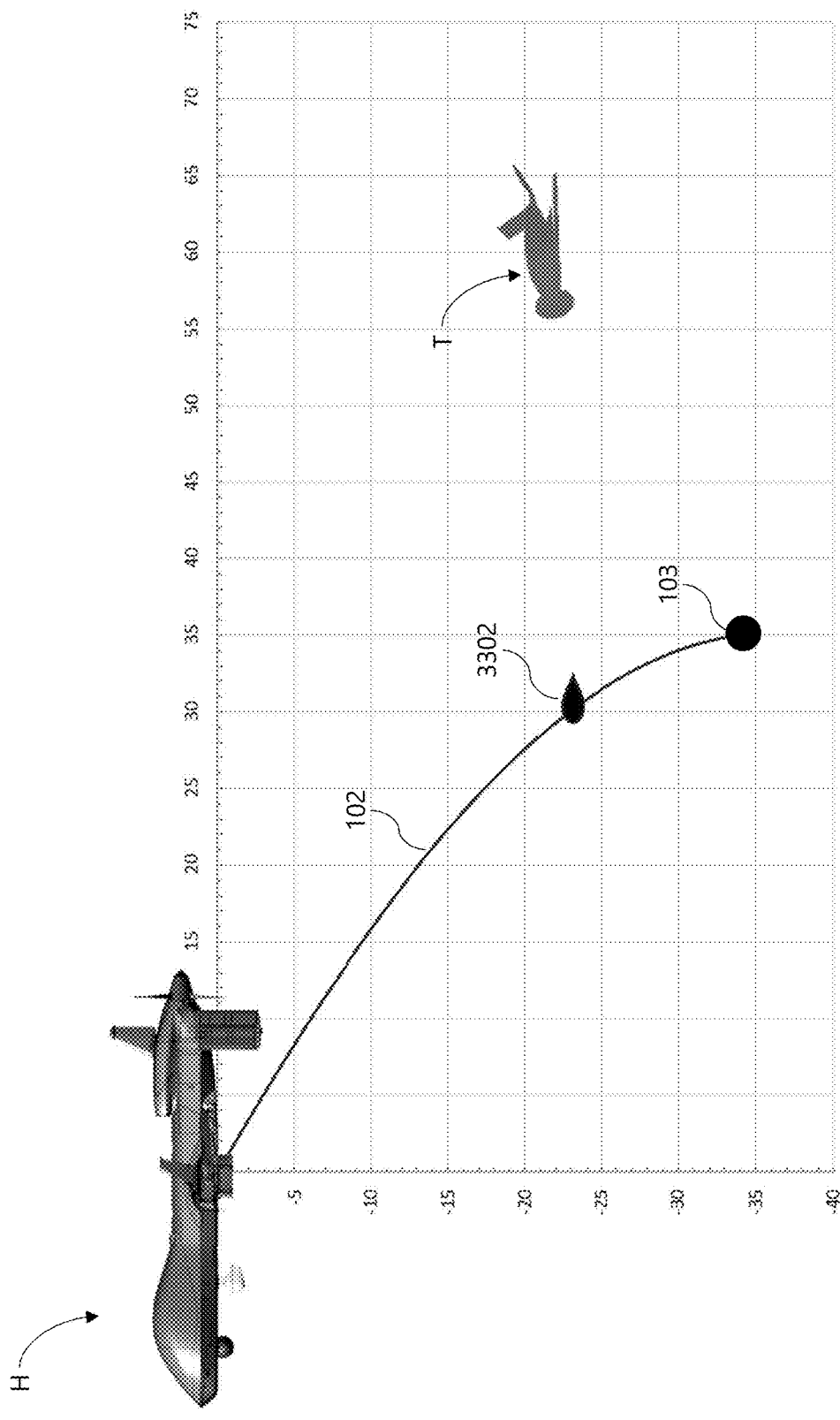
FIG. 7 is an example of a navigation system with a separate navigation body disposed on a towline according to some embodiments.

FIG. 7 is an illustration of another example embodiment of a relative navigation system that uses a separate navigation body according to some embodiments. A towline 102 can be paid out and reeled in by a host aircraft H and can have an end fitting 103 attached at or near the end of the towline 102, which can be captured by a target aircraft T. A navigation body 3302 can be coupled to the towline a distance above the end fitting 103 such that the navigation body 3302 will not interfere with the capture of the end fitting 103 by the target aircraft T. As in the case of navigation electronics included inside an end fitting, location information can be sent directly from the navigation body 3302 to the target aircraft T or can be first transmitted to the host aircraft H using a wireless connection or a wired connection. In some embodiments, the navigation electronics can be battery powered, while in other embodiments, the navigation electronics can receive power from the host aircraft, for example via the towline 102.

Real-Time Local Positioning

In any embodiments disclosed herein, a real-time local positioning system (RT-LPS) can be used for navigating a target aircraft to a towline for recovery by a host aircraft. A host aircraft can be equipped with one or more beacons (for example, visible light emitters, RF emitters, near infrared emitters, and so forth) disposed at known locations on the host aircraft. The real-time local positioning system can be used to determine the relative position and orientation of a target aircraft with respect to a host aircraft. In some embodiments, an end fitting can be equipped with sensors so that the end fitting can determine its location with respect to the host aircraft using the beacons on the host aircraft.

Figure 8:
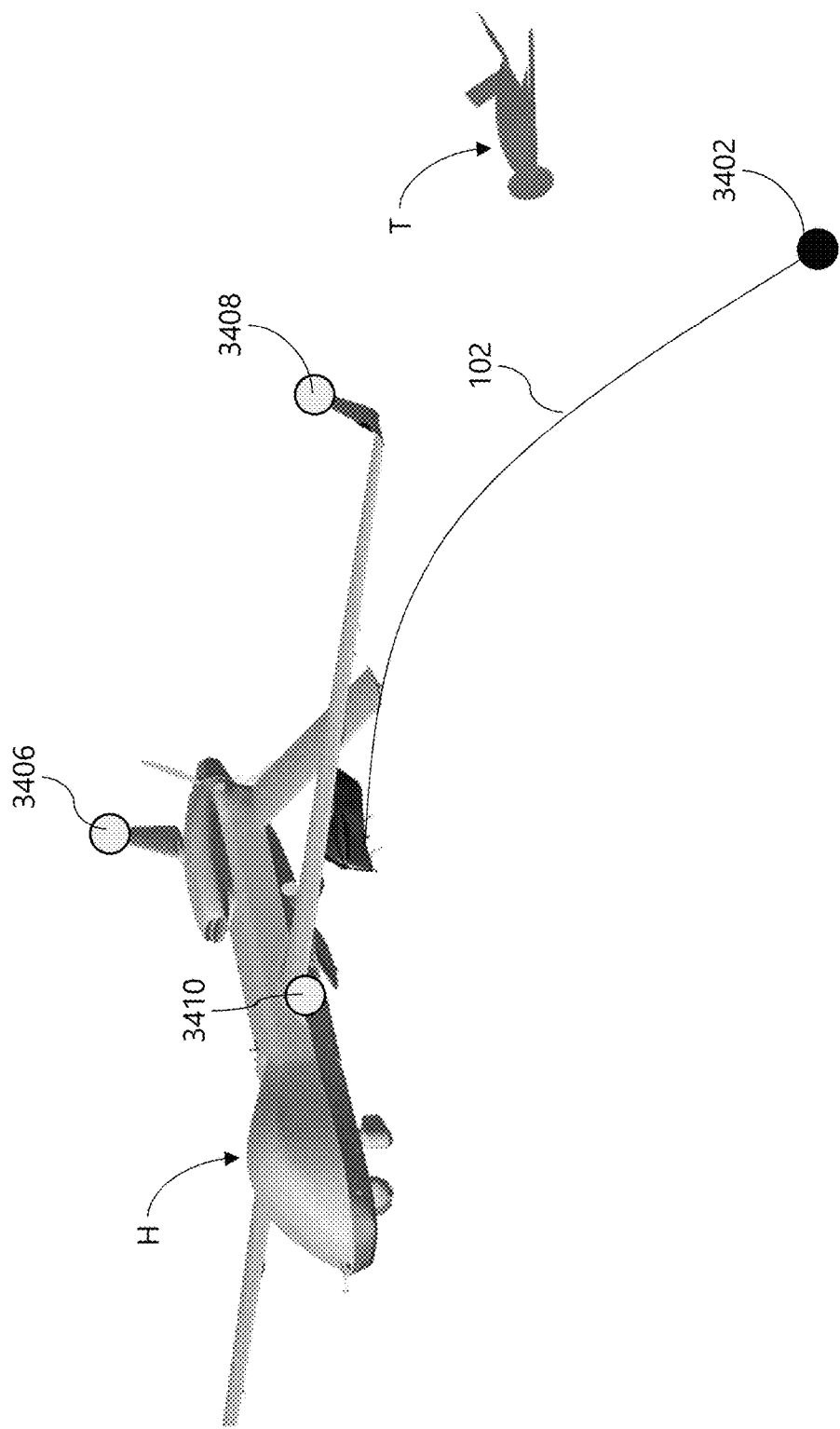
FIGS. 8 and 9 are example illustrations of real-time local positioning navigation systems according to some embodiments.

FIG. 8 is an illustration of an example embodiment of a real-time local positioning system according to some embodiments. A host aircraft H has a towline 102 coupled therewith, and an end fitting 3402 is coupled at or near the end of the towline 102 and designed for capture by the target aircraft T. The host aircraft can have beacons 3406, 3408, and 3410 disposed thereon. The beacons 3406, 3408, and 3410 can be placed strategically to aid in determining relative horizontal and/or vertical positions of the end fitting 3402 and/or the target aircraft T. The end fitting 3402 and the target aircraft T can each be equipped with one or more sensors to detect the beacons 3406, 3408, and 3410 to determine their locations with respect to the host aircraft H. A system onboard the target aircraft T can use the determined relative locations to compute the location of the target T with respect to the end fitting 3402.

Figure 9:
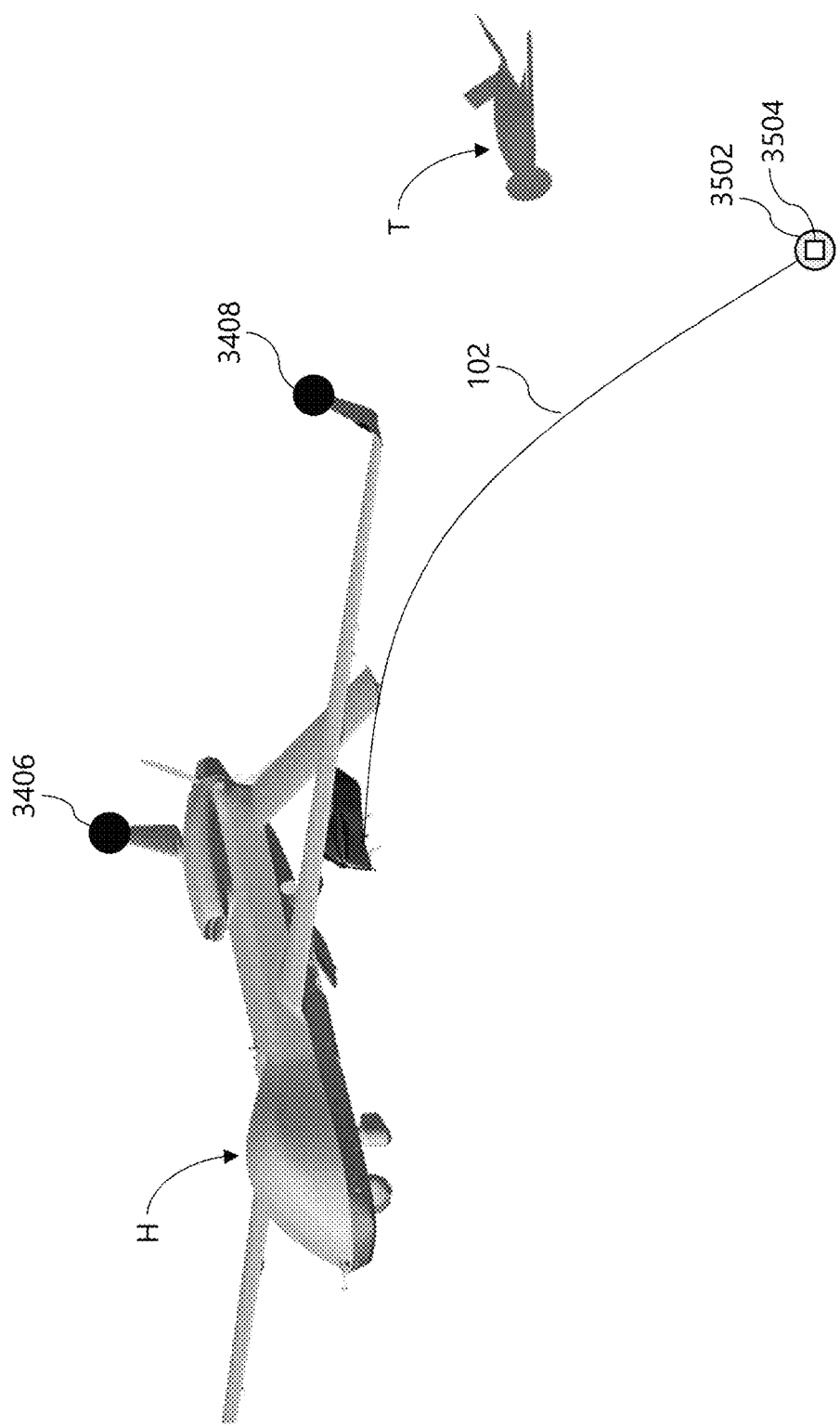

FIG. 9 is an illustration of another example embodiment of a real-time location positioning system. In FIG. 9, a host aircraft H can have a towline 102 coupled therewith, and an end fitting 3402 coupled at or near the end of the towline 102 and designed for capture by the target aircraft T. The end fitting 3502 can include a beacon 3504. A beacon 3406 can be disposed at a rudder portion of the host aircraft H and a beacon 3408 can be disposed at a wing tip of the host aircraft H. The target aircraft T can have at least one sensor for detecting signals emitted by the beacons 3504, 3406, and 3408. In some embodiments, the target aircraft T can use the rudder beacon 3406 and the end fitting beacon 3504 to determine a relative vertical position of the target aircraft T and can use the rudder beacon and the wing tip beacon 3408 to determine a relative horizontal position of the target aircraft T.

FIG. 8 and FIG. 9 are two example embodiments of a real-time location navigation system. The skilled artisan will appreciate that other embodiments are possible. In some embodiments, more or fewer beacons can be used, beacons can be placed in different locations, and so forth. For example, in some embodiments, one or more beacons can be fitted along the towline.

In some embodiments, rather than or in addition to beacons, the RT-LPS system can rely on fiducial markers or other features at known locations to determine relative positions of the end fitting and/or the target aircraft. For example, fiducial markers can be disposed at the beacon locations described above, or at other suitable locations.

Visual Navigation

In some embodiments, a target aircraft (for example, a UAV) can use visual navigation to locate the towline. Such a system may be desirable when aircraft are deployed in relatively amiable conditions (e.g., limited turbulence, clear skies, etc.). In such cases, a single beacon or emitter can be used to aid in navigating a target aircraft to an end fitting on a towline. However, a visual navigation system may not be desirable in some circumstances. For example, such systems may perform poorly in adverse weather and/or lighting conditions, and sensor equipment can create difficulties with respect to size, weight, and power constraints.

In some embodiments, a visual navigation system can have a wide field of view, for example 90° or approximately 90°, 120° or approximately 120°, 150° or approximately 150°, or 180° or approximately 180°, or of any value or ranges of values between any of the foregoing values. In some embodiments, the field of view may exceed 180°.

In some embodiments, the visual navigation system can include at least one high resolution image sensor. In some embodiments, depth tracking may be desirable and thus multiple cameras or detectors can be used to enable the navigation system to determine 3D coordinates, for example the coordinates of a towline end feature. Advantageously, 3D coordinates can be determined in real time or nearly real time. It may be desirable to operate the navigation system in adverse conditions such as indirect sunlight, direct sunlight, or both.

Various types of detectors can be used for the visual navigation system. For example, such a system can use LIDAR or time of flight systems that can operate under daylight conditions (e.g., fixed LIDAR or flash LIDAR), a camera that senses only light intensity, a plenoptic camera that captures intensity and direction information, a stereo camera, a high resolution monochrome camera, an infrared camera, an electro-optical camera, and so forth. In some cases, the visual navigation system can include a non-optical range sensor for use in conjunction with optical sensors. Optical systems can be mounted to minimize vibration issues, although vibrations may still limit the accuracy of visual navigation systems. While the embodiments described herein relate primarily to camera systems that can operate at visible and/or near infrared wavelengths, imaging is not necessary and other embodiments are anticipated, such as embodiments that use RF emitters and sensors for navigation.

In some embodiments, the visual navigation system can operate in daylight conditions. In some embodiments, the visual navigation system can operate in direct and/or indirect sunlight. In some embodiments, the visual navigation system can operate in the visible spectrum. In some embodiments, the visual navigation system can include illumination sources. For example, the visual navigation system can include near infrared lighting and/or visible light lamps to enable night operation and/or operation under adverse conditions. In some embodiments, the visual navigation system can include computing hardware and software for computer vision. For example, the visual navigation system can use artificial intelligence-based object detection algorithms to detect an end feature, estimate pose and range, and so forth.

Preferably, the visual navigation system occupies a relatively small volume and consumes relatively little power. This can be especially important for small target aircraft (e.g., small UAV's), where space and available energy are limited. For example, a navigation system can occupy from 50 or approximately 50 cubic inches to 1000 or approximately 1000 cubic inches, for example approximately 1000 cubic inches, approximately 750 cubic inches, approximately 500 cubic inches, approximately 250 cubic inches, or approximately 50 cubic inches, from 200 or approximately 200 cubic inches to 750 or approximately 750 cubic inches, or any volume or ranges of volumes within any of the foregoing ranges, including the endpoints. A navigation can consume, for example, from about 50 W to about 150 W during operation, for example about 50 W, about 75 W, about 100 W, about 125 W, or about 150 W, or any power within this range and including the endpoints.

Figure 10:
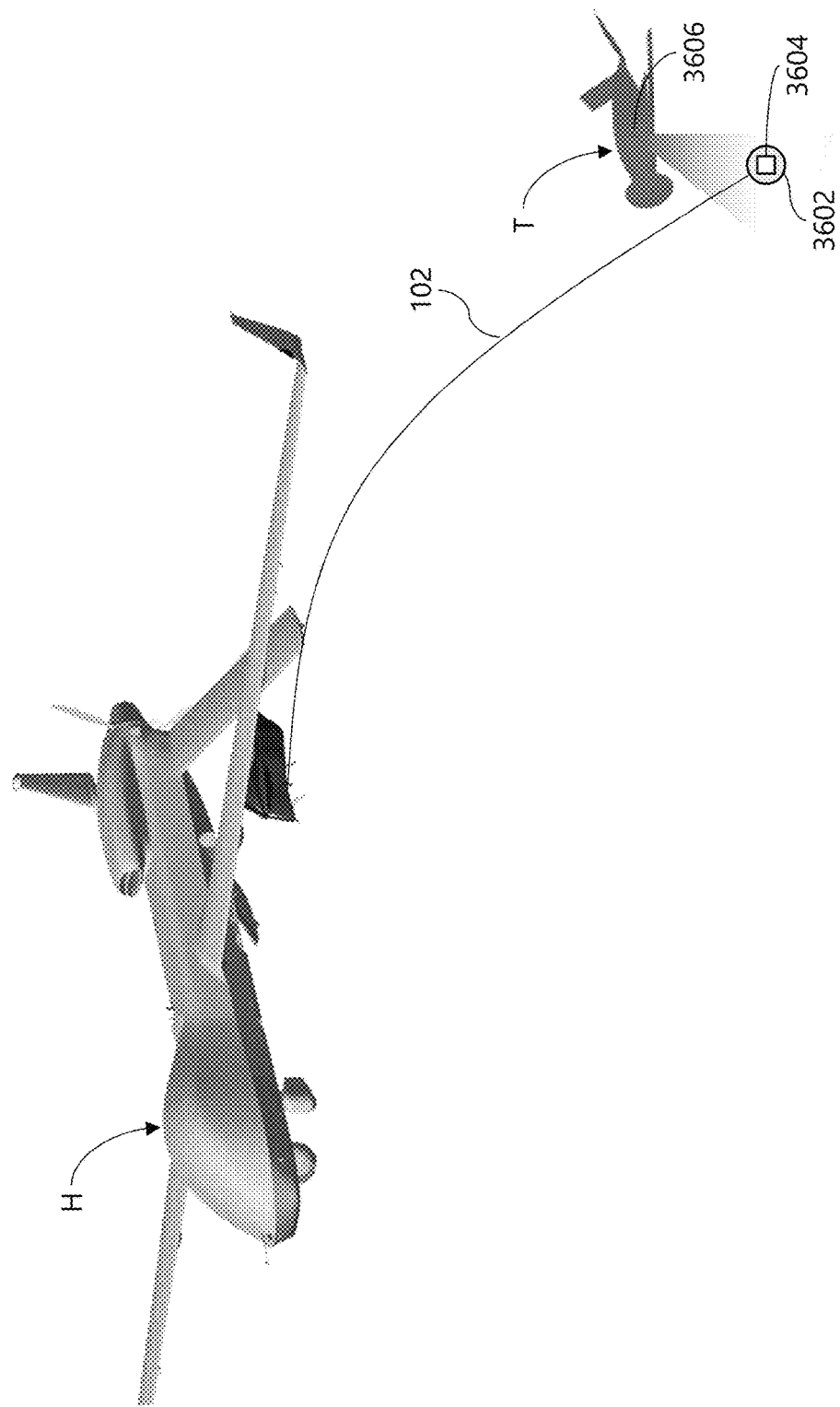
FIGS. 10 and 11 are example illustrations of visual navigation systems according to some embodiments.

FIG. 10 illustrates an example embodiment of a beacon-assisted navigation system. In FIG. 10, host aircraft H is equipped with a towline 102 that can be paid out and reeled in. The towline 102 has an end fitting 3602 affixed at or near the distal end of the towline 102. The end fitting 3602 can include a beacon 3604 which can be, for example, an RF emitter, a near infrared emitter, a visible emitter, and so forth.

The target aircraft T can navigate near the beacon 3604, for example using RTK GPS and other navigational information available from avionics equipment onboard the target aircraft T (e.g., an inertial measurement unit). Once the beacon 3604 is in range of the sensor 3606 affixed to the target aircraft T, the target aircraft T can use the signal from the beacon 3604 to navigate to a location where the target aircraft T can intercept the towline 102 and capture the end fitting 3602.

In some embodiments, rather than affixing a beacon to the end fitting, a heater can be affixed to the towline. For example, a heating ribbon can be wrapped around a portion of the towline to form a sleeve. Power can be supplied to the heater material via the towline (e.g., from the host aircraft). Under ordinary lab conditions, such a sleeve can achieve a temperature of about 1400° F. or more. Temperatures may be significantly lower when deployed on an airborne towline. Advantageously, the heater sleeve can be sufficiently thin and flexible to allow for reeling the towline in and out while the sleeve is in place. A target vehicle can be equipped with an infrared sensor to detect the heated portion of the towline. A longer heated portion can increase the distance from which the target aircraft can detect the beacon.

In some embodiments, rather than a heater that emits near infrared light, the towline can be equipped with a metallic sleeve to form a dipole antenna. The dipole antenna can be used to broadcast an RF signal that can be detected by a sensor on the target aircraft.

Figure 11:
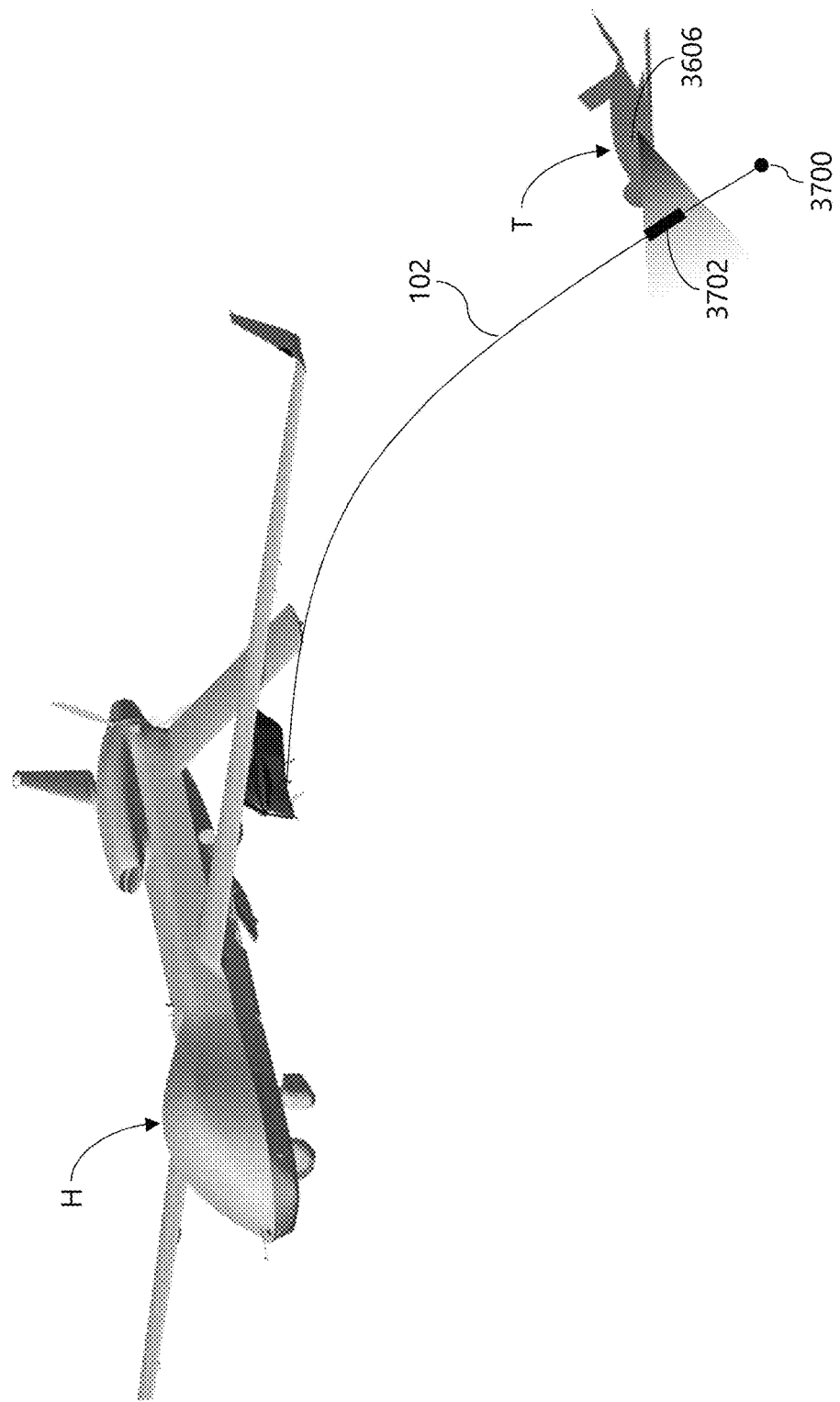

FIG. 11 illustrates another example embodiment of beacon-assisted navigation according to some embodiments. In FIG. 11, a host aircraft H is equipped with a towline 102 that can be paid out and reeled in. As in other embodiments, the towline 102 can have an end fitting 3700 affixed at or near the distal end of the towline 102. In some embodiments, a portion of the towline can include a heater 3702 configured to emit infrared light that can be detected by the sensor 3606 aboard the target aircraft T. In such embodiments, once the target is in range of the sensor 3606, the target aircraft T can use the signal from the heater 3702 to navigate to a location where the target aircraft T can intercept the towline 102 and capture the end fitting 3700.

In some embodiments, a visual navigation system may not use beacons for navigation. A visual navigation system can instead utilize fiducial markers and/or known features on a host aircraft, towline, end fitting, and so forth to determine relative positioning of a target aircraft and the host aircraft, towline, end fitting, etc. In some embodiments, both beacons and markers or other detectable features can be used. In some embodiments, a target aircraft can have a plurality of cameras for detecting markers, and a processing system can use the information from the plurality of cameras to determine a relative distance, orientation, or both between the target aircraft and the host, towline, and/or end fitting. In some embodiments, the system can utilize a single camera. The single camera can reduce complexity, size, and weight of the navigation system, but can also reduce the accuracy of the determined relative positioning and/or orientation of the target aircraft with respect to the host aircraft, towline, or end fitting, in some embodiments.

The embodiments of the visual navigation systems described above can have suitable range and navigational errors for many in-flight recovery situations. For example, the systems described above can have a range of about 500 feet for pose determination and can operate over even longer distances if only azimuth and elevation information is desired. The operational range depends on the separation distance of beacons, fiducial markers, and/or known features, depending on the specific navigational system used. When active emitters (e.g., beacons) are used, the range can also depend on the output power of the beacons. Some embodiments of the systems that use near infrared beacons can work well in night conditions, while some embodiments of the camera systems that use fiducial markers or other features with known locations can work well in daylight conditions (or night conditions with the use of illumination), although in some cases they may struggle in direct sunlight. In some embodiments, visual navigation systems can have navigational system errors of about 10 cm RMS or less transverse to the optical axis and about 30 cm RMS or less longitudinal with the optical axis at a distance of about 10 m. At a distance of about 1 m, a visual navigation system can have an error of about 1 cm RMS or less transverse to the optical axis and about 5 cm RMS or less longitudinal with the optical axis.

The type of visual navigation system used can depend on factors such as operating conditions and available space, weight, and power. For example, a camera-based system that uses a single camera to detect features or fiducial markers can be relatively lightweight and consume relatively little power and space compared to a multi-camera system. In some embodiments, a NIR-based system can use significantly larger sensors than a system that uses a single camera. However, a multi-camera system or a system that utilizes NIR beacons can be better suited to adverse flight conditions than a system that uses only a single camera.

Blended Navigation

Standard GPS, RTK GPS, RT LPS, visual navigation systems, and sound-based navigation systems described above each have different advantages and limitations. Thus, in some embodiments, two or more systems can be used in conjunction with one another to improve the accuracy and reliability of the relative navigation system, and to improve the probability of the recovery of a target aircraft by a host aircraft, for example by increasing success rates under various conditions and/or reducing the time for a target aircraft to navigate to a towline and capture an end fitting. In some embodiments, a first navigation method can be used when the target aircraft is relatively far from the host aircraft, and a second navigation method can be used when the target aircraft is relatively close to the host aircraft.

In some example embodiments, a blended navigation system can use a combination of broadband radio ranging beacons and NIR beacons disposed at known locations on the host aircraft, towline, and/or end fitting. The target aircraft can detect the radio beacons from a relatively long distance and under conditions in which signals from the NIR beacons may be blocked or difficult to separate from NIR emissions from other sources. Once the target aircraft navigates to a location near the host aircraft using the radio beacons, the target can use the NIR beacons to navigate more precisely into position to intercept the towline and capture the end fitting. In addition to being useful for different ranges, the blended navigation system can remain operational when there are problems with one navigational subsystem, such as when visual acquisition is lost.

In another example embodiment, a blended navigation system can use a combination of RTK GPS and LIDAR. A target aircraft can navigate with a position near a host aircraft using RTK GPS signals, and then can use a LIDAR system to resolve close-in features, for example to resolve the towline. In some embodiments, the target aircraft has a fixed LIDAR system or a flash LIDAR system. The fixed LIDAR system can typically be used over larger distances, but the scanning method of operation can make it difficult to resolve the thin towline, especially when the towline is experiencing rapid acceleration, changes in direction, or other motion. A flash LIDAR system illuminates an entire scene at once using a wide diverging laser and a sensor array, which allows for the capture of the entire scene at a single point in time and can enable the resolution of small features such as towline.

Figure 12:
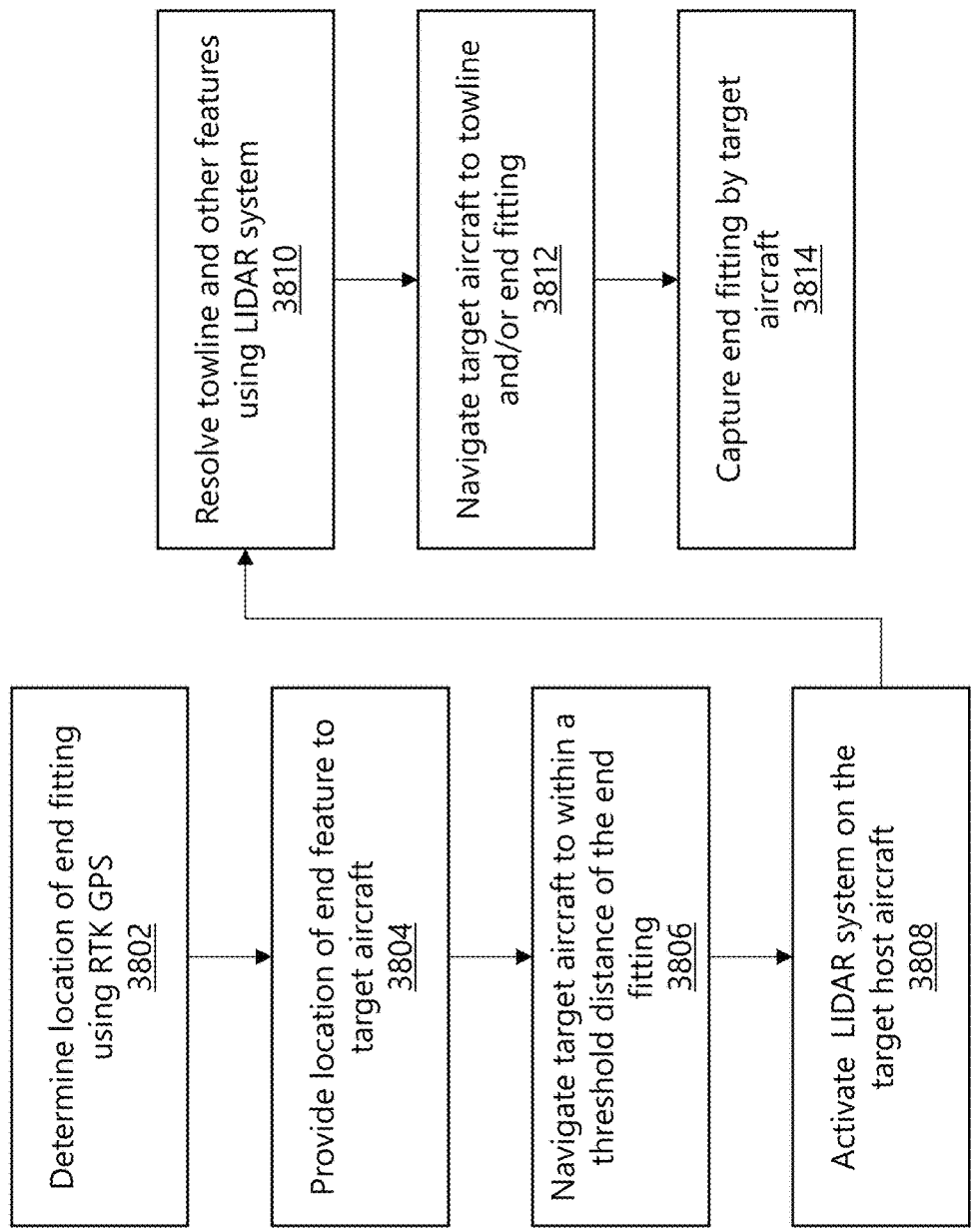
FIG. 12 is a block diagram depicting an example process for blended navigation according to some embodiments.

FIG. 12 is a flowchart of an example process for blended navigation according to some embodiments. In other embodiments, different navigation systems can be used, and any steps can be added, removed, combined, or performed in a different order. For example, in some embodiments, two or more methods can be used simultaneously rather than one after the other.

As shown in the example embodiment of FIG. 12, at block 3802, a navigation system determines a location of an end fitting using RTK GPS (e.g., using GPS measurements sent from the fitting over a wireless communications link). At 3804, the system provides the location of the end feature to the target aircraft (e.g., to a target aircraft's controller). At block 3806, the target aircraft navigates to within a threshold distance of the end fitting and then, at block 3808, activates a LIDAR system on the target aircraft for use in resolving the towline at block 3810. The threshold distance can be a distance below which LIDAR performs reliably. For example, a typical automotive LIDAR system can operate reliably up to a distance of about 650 feet. In some embodiments, the threshold can be lower. For example, in some embodiments, the threshold distance can be 650 feet or about 650 feet, 500 feet or about 500 feet, 400 feet or about 400 feet, 300 feet or about 300 feet, 200 feet or about 200 feet, or any distance between these distances, or even less if desired. The target aircraft then uses the resolved towline to navigate toward the towline and end feature at block 3812, enabling capture of the end fitting by the target aircraft at block 3814.

The above embodiments are merely examples. Any suitable or desirable combination of navigational systems can be used for blended navigation. In some embodiments, more than two systems can be used.

As mentioned briefly above, a navigation system can advantageously have a wide field of view and illumination sources. In some embodiments, the navigation system can resolve a small sphere, for example about 3" in diameter (e.g., an end fitting, which can be a sphere or can be another shape of similar size), from a distance of about 24" or more. In some embodiments, the navigation system can track the sphere in three dimensions, and thus multiple cameras can be used, and positional data can be computed in real time or nearly real time. In some embodiments, two cameras can be used for navigation. For example, one camera can operate in a range of from about 10" to about 24." Said camera can be a color camera, a high resolution monochrome camera, etc. The navigation system can include NIR illumination (e.g., pulsed NIR illumination) for night operation and can use daylight images. A second camera can be used for closer ranges. For example, a LIDAR or time of flight camera compatible with daylight operation can be used. Software can be used to fuse the data from the different cameras to determine 3D positioning.

Host-Driven Visual Navigation

As discussed briefly above, the size and weight of some embodiments of the visual navigation system can be optimized to stay within size, weight, and power constraints when visual navigation sensors (e.g., cameras, LIDAR detectors, and so forth) are placed on a target aircraft, inside a fitting, and so forth. In some embodiments, it may be desirable to reduce the weight of a target aircraft and/or to reduce the hardware that is present onboard the target aircraft (for example, to increase the range of the target aircraft, to prevent hardware from falling into enemy hands, etc.). In some embodiments, a host aircraft can be equipped with one or more detectors such as, for example, a stereovision camera, that can be used to monitor the position of the towline end fitting and the target aircraft. In some embodiments, the towline end feature and target aircraft can be equipped with emitters so that the detector on the host aircraft receives signals from the emitters, and a computing device on the host aircraft can determine the location of the target aircraft relative to the towline end feature. In some embodiments, the target and host aircraft can be configured with a data link to enable the host aircraft to transmit to the target aircraft the relative location of the target aircraft and the towline end feature.

In some embodiments, the host aircraft can be fitted with a stereovision camera. For example, a stereovision camera can be incorporated into or mounted on a recovery pylon or pod and watch the end feature and target aircraft as it approaches. A stereovision camera may be able to resolve position with a high level of accuracy. For example, a stereovision camera can include two camera elements separated by a distance of about 1", 2", 3", 4", 5", 6", 8", 10", 12", 14", or more, or any number between these numbers. In some embodiments, a stereo vision camera with a separation between camera elements of about 12" can resolve the position of objects to within about 2" or less, for example to within about 1.5".

Figure 13:
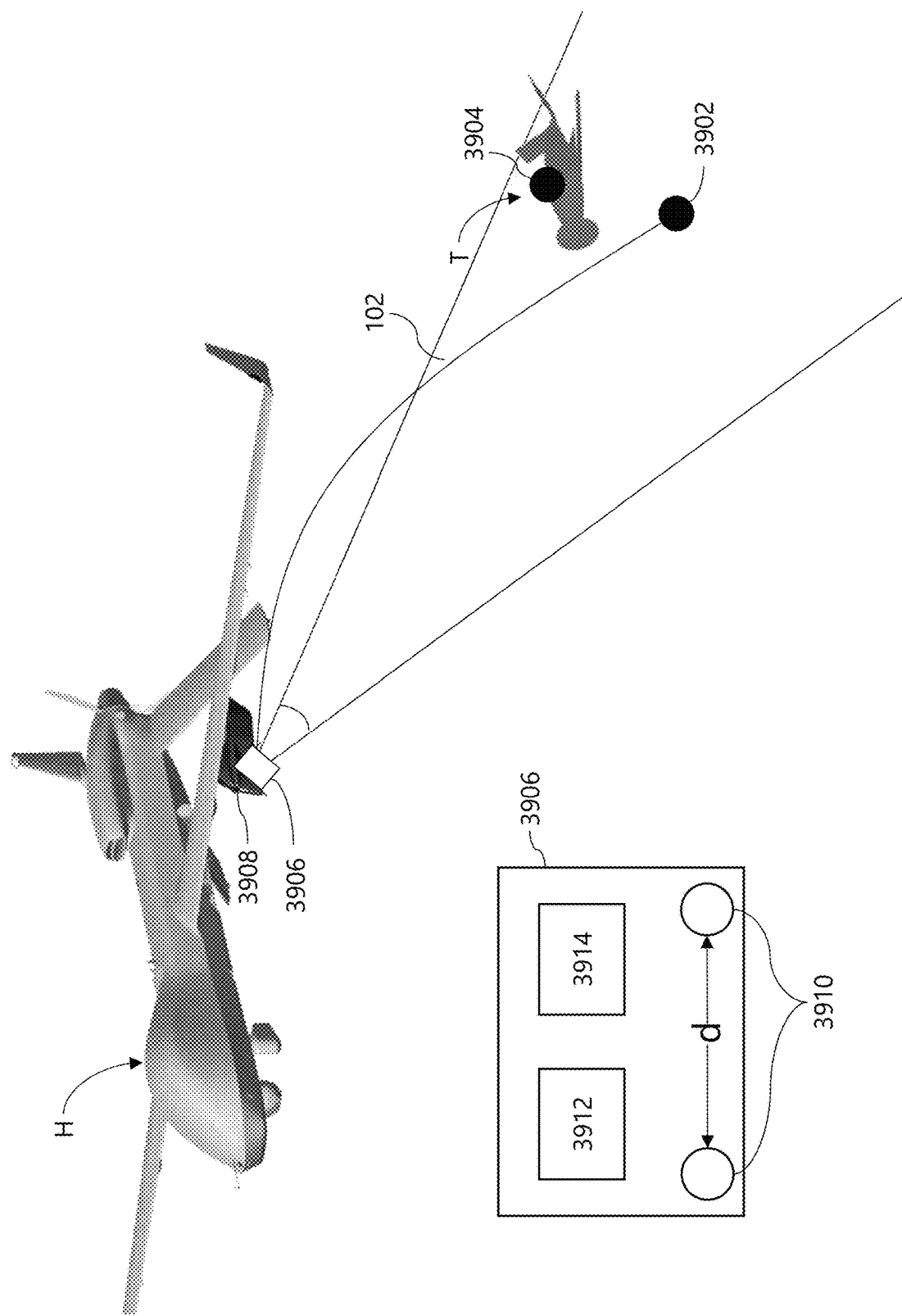
FIG. 13 is an example illustration of a navigation system using a stereovision camera mounted on a supply aircraft according to some embodiments.

FIG. 13 depicts an example embodiment of a stereo camera-based recovery system. In FIG. 13, a host aircraft H is equipped with a towline 102 that can be paid out and reeled in from a recovery pylon or pod 3908. The towline 102 can have an end fitting 3902 that can be, in some embodiments, equipped with an emitter (e.g., an RF emitter, near infrared emitter, visible light emitter, etc.). The target aircraft T can include an emitter 3904. In some embodiments, the emitter 3904 can be located on a wing, tail, nose, etc., of the target aircraft. In some embodiments, the emitter 3904 can advantageously be placed on a surface of the target aircraft that is within a line of sight of the stereo camera system 3906. A stereo camera system 3906 having elements 3910 separated by a distance d can be mounted on the host aircraft H (e.g., on the recovery pylon 3908). In some embodiments, the stereo camera system can include a communications module 3912 and/or an image processing module 3914. In some embodiments, communications and image processing circuitry can be located outside the camera system, for example in the pod 3908 or elsewhere on the host aircraft H. In operation, the stereo camera system 3906 can detect signals from the emitter of the end fitting 3902 and the emitter 3904, and a processing system, which can be part of the stereo camera system or a separate system, can compute the relative position of the target aircraft T with respect to the end fitting 3902. A data link can wirelessly transmit the relative location information to the target aircraft T, which uses the relative location information to navigate toward and capture the end fitting 3902.

ADDITIONAL EMBODIMENTS

Any portion of any of the steps, processes, structures, and/or devices disclosed or illustrated in one example in this disclosure can be combined or used with (or instead of) any other portion of any of the steps, processes, structures, and/or devices disclosed or illustrated in a different example or flowchart. The examples described herein are not intended to be discrete and separate from each other. Combinations, variations, and some embodiments of the disclosed features are within the scope of this disclosure.

While operations may be depicted in the drawings or described in the specification in a particular order, such operations need not be performed in the particular order shown or in sequential order, or that all operations be performed, to achieve desirable results. Other operations that are not depicted or described may be incorporated in the example methods and processes. For example, one or more additional operations may be performed before, after, simultaneously, or between any of the described operations. Additionally, the operations may be rearranged or reordered in some embodiments. Also, the separation of various components in the embodiments described above should not be understood as requiring such separation in all embodiments, and it should be understood that the described components and systems may generally be integrated together in a single product or packaged into multiple products. Additionally, some embodiments are within the scope of this disclosure.

Terms of orientation used herein, such as "top," "bottom," "proximal," "distal," "longitudinal," "lateral," and "end," are used in the context of the illustrated example. However, the present disclosure should not be limited to the illustrated orientation. Indeed, other orientations are possible and are within the scope of this disclosure. Terms relating to circular shapes as used herein, such as diameter or radius, should be understood not to require perfect circular structures, but rather should be applied to any suitable structure with a cross-sectional region that may be measured from side-to-side. Terms relating to shapes generally, such as "circular," "cylindrical," "semi-circular," or "semi-cylindrical" or any related or similar terms, are not required to conform strictly to the mathematical definitions of circles or cylinders or other structures but may encompass structures that are reasonably close approximations.

Conditional language, such as "may," "could," "might," or "may," unless specifically stated otherwise, or otherwise understood within the context as used, is generally intended to convey that certain examples include or do not include certain features, elements, and/or steps. Thus, such conditional language is not generally intended to imply that features, elements, and/or steps are in any way required for one or more examples.

Conjunctive language, such as the phrase "at least one of X, Y, and Z," unless specifically stated otherwise, is otherwise understood with the context as used in general to convey that an item, term, etc. may be either X, Y, or Z. Thus, such conjunctive language is not generally intended to imply that certain examples require the presence of at least one of X, at least one of Y, and at least one of Z.

The terms "approximately," "about," and "substantially" as used herein represent an amount close to the stated amount that still performs a desired function or achieves a desired result. For example, in some examples, as the context may dictate, the terms "approximately," "about," and "substantially," may refer to an amount that is within less than or equal to 10% of the stated amount. The term "generally" as used herein represents a value, amount, or characteristic that predominantly can include or tends toward a particular value, amount, or characteristic. As an example, in certain examples, as the context may dictate, the term "generally parallel" may refer to something that departs from exactly parallel by less than or equal to 20°. All ranges are inclusive of endpoints.

Several illustrative examples of towlines and related systems and methods have been disclosed. Although this disclosure has been described in terms of certain illustrative examples and uses, other examples and other uses, including examples and uses which do not provide all of the features and advantages set forth herein, are also within the scope of this disclosure. Components, elements, features, acts, or steps may be arranged or performed differently than described and components, elements, features, acts, or steps may be combined, merged, added, or left out in various examples. All possible combinations and subcombinations of elements and components described herein are intended to be included in this disclosure. No single feature or group of features is necessary or indispensable.

Certain features that are described in this disclosure in the context of separate embodiments may also be implemented in combination in a single embodiment. Conversely, various features that are described in the context of a single embodiment also may be implemented in multiple embodiments separately or in any suitable subcombination. Moreover, although features may be described above as acting in certain combinations, one or more features from a claimed combination may in some cases be excised from the combination, and the combination may be claimed as a subcombination or variation of a subcombination.

Further, while illustrative examples have been described, any examples having equivalent elements, modifications, omissions, and/or combinations are also within the scope of this disclosure. Moreover, although certain aspects, advantages, and novel features are described herein, not necessarily all such advantages may be achieved in accordance with any particular example. For example, some examples within the scope of this disclosure achieve one advantage, or a group of advantages, as taught herein without necessarily achieving other advantages taught or suggested herein. Further, some examples may achieve different advantages than those taught or suggested herein.

Some examples have been described in connection with the accompanying drawings. The figures may or may not be drawn and/or shown to scale, but such scale should not be limiting, since dimensions and proportions other than what are shown are contemplated and are within the scope of the disclosed invention. Distances, angles, etc. are merely illustrative and do not necessarily bear an exact relationship to actual dimensions and layout of the devices illustrated. Components may be added, removed, and/or rearranged. Further, the disclosure herein of any particular feature, aspect, method, property, characteristic, quality, attribute, element, or the like in connection with various examples may be used in all other examples set forth herein. Additionally, any methods described herein may be practiced using any device suitable for performing the recited steps.

For purposes of summarizing the disclosure, certain aspects, advantages, and features of the inventions have been described herein. Not all, or any such advantages are necessarily achieved in accordance with any particular example of the inventions disclosed herein. No aspects of this disclosure are essential or indispensable. In many examples, the devices, systems, and methods may be configured differently than illustrated in the figures or description herein. For example, various functionalities provided by the illustrated modules may be combined, rearranged, added, or deleted. In some embodiments, additional or different processors or modules may perform some or all of the functionalities described with reference to the examples described and illustrated in the figures. Many embodiment variations are possible. Any of the features, structures, steps, or processes disclosed in this specification may be included in any example.

In summary, various examples of towlines and related systems and methods have been disclosed. This disclosure extends beyond the specifically disclosed examples to other alternative examples and/or other uses of the examples, as well as to certain modifications and equivalents thereof. Moreover, this disclosure expressly contemplates that various features and aspects of the disclosed examples may be combined with, or substituted for, one another. Accordingly, the scope of this disclosure should not be limited by the particular disclosed examples described above, but should be determined only by a fair reading of the claims.

What is claimed is:

1. A system for recovery of a target aircraft by a host aircraft, the system comprising:
   a towline comprising a proximal section configured to be coupled with the host aircraft and a distal section configured to be paid out from the host aircraft;
   a fitting coupled with the distal section of the towline, wherein the fitting comprises:
      a housing;
      a global navigation satellite system receiver; and
      a global navigation satellite system antenna.

2. The system of claim 1, wherein the fitting further comprises a ballast.

3. The system of claim 1, wherein, when paid out from the host aircraft, the towline is configured to be in a substantially vertical orientation.

4. The system of claim 1, further comprising a capture mechanism configured to be coupled with a fuselage of the target aircraft and configured to capture the fitting.

5. The system of claim 1, wherein the global navigation satellite system receiver is a global positioning system receiver, and wherein the global positioning system receiver comprises:
   a computer readable storage medium having program instructions embodied thereon; and
   one or more processors configured to execute the program instructions to:
      receive a GPS signal;
      receive a correction stream; and
      calculate a location of the global positioning system receiver using the received GPS signal and the received correction stream.

6. The system of claim 1, wherein the fitting further comprises an inertial measurement unit.

7. The system of claim 1, wherein the global navigation satellite system antenna comprises one or more controlled reception pattern antennas.

8. The system of claim 1, wherein the fitting further comprises a wireless communications system.

9. The system of claim 8, wherein the wireless communications system comprises an RF communications module.

10. The system of claim 8, wherein the wireless communications system comprises a software-defined radio module.

11. The system of claim 1, wherein the global navigation satellite system receiver is a global positioning system receiver, and wherein the global positioning system receiver comprises:
    a computer readable storage medium having program instructions embodied thereon; and
    one or more processors configured to execute the program instructions to:
       receive a GPS signal; and
       transmit a correction stream for calculating on a roving platform a location of the global positioning system receiver using the roving platform's received GPS signal and the transmitted correction stream.

12. A system for recovery of a target aircraft by a host aircraft, the system comprising:
    a towline comprising a proximal section configured to be coupled with the host aircraft and a distal section configured to be paid out from the host aircraft;
    a navigation body coupled with the distal section of the towline a distance away from a distal end of the towline, the navigation body comprising:
       a housing;
       a global navigation satellite system receiver; and
       a global navigation satellite system antenna;
    a fitting coupled with the distal section of the towline; and
    a capture mechanism configured to be coupled with a fuselage of the target aircraft and to capture the fitting.

13. The system of claim 12, wherein the navigation body is located between 10 feet and 20 feet away from the distal end of the towline, and wherein the fitting is located at the distal end of the towline.

14. The system of claim 12, wherein the navigation body further comprises a wireless communications module.

15. A system for recovery of a target aircraft by a host aircraft during flight, the system comprising:
    a towline comprising a proximal section configured to be coupled with the host aircraft and a distal section configured to be paid out from the host aircraft;
    a fitting coupled with the distal section of the towline;
    a beacon disposed at the fitting; and
    a detector disposed on the target aircraft.

16. The system of claim 15, further comprising:
    a beacon disposed at a rudder of the host aircraft; and
    a beacon disposed at a wing tip of the host aircraft,
    wherein the detector is a near infrared camera, and
    wherein the beacons are configured to emit near infrared light.

17. The system of claim 15, wherein the host aircraft comprises a plurality of fiducial markers, and wherein the detector is an electro-optical camera.

18. The system of claim 15, further comprising:
    a radio receiver disposed on the target aircraft;
    one or more beacons configured to emit near infrared light and disposed on the host aircraft, the fitting, or both; and
    one or more beacons configured to emit a broadband radio signal and disposed on the host aircraft, the fitting, or both,
    wherein the detector is a near infrared camera.

19. The system of claim 15, wherein the detector comprises a LIDAR detector, and wherein the system further comprises a global positioning system receiver capable of real-time kinematics corrections.

20. A method of recovering a target aircraft by a host aircraft during flight, the method comprising:
- extending from the host aircraft a towline having a fitting comprising a real-time kinematics GPS receiver;
- determining, by the real-time kinematics GPS receiver, a location of the fitting;
- transmitting, using a wireless communications module, the location of the fitting to the target aircraft;
- navigating the target aircraft to a location near the location of the fitting;
- intercepting, by the target aircraft, the fitting; and
- securing, by the target aircraft, the towline to the target aircraft.

21. The method of claim 20, wherein the wireless communications module is disposed in the fitting.

22. The method of claim 20, wherein the wireless communications module is disposed in the host aircraft.

23. A method of recovering a target aircraft by a host aircraft during flight, the method comprising:
- extending from the host aircraft a towline having a fitting comprising a real-time kinematic capable GPS receiver;
- transmitting, using a wireless communications module, real-time kinematic data obtained with the real-time kinematic capable GPS receiver to the target aircraft;
- determining, by a real-time kinematic GPS receiver on the target aircraft, a location of the fitting;
- navigating the target aircraft to a location near the location of the fitting;
- intercepting, by the target aircraft, the fitting; and
- securing, by the target aircraft, the towline to the target aircraft.

24. A method of recovering a target aircraft by a host aircraft during flight, the method comprising:
- receiving, from a navigation body affixed to a towline, inertial measurement unit data associated with the navigation body and real-time kinematic GPS data associated with the navigation body;
- receiving, from the target aircraft, inertial measurement unit data associated with the target aircraft and real-time kinematic GPS data associated with the target aircraft;
- determining, based on the inertial measurement unit data associated with the navigation body and the inertial measurement unit data associated with the target aircraft, a relative location of the target aircraft with respect to the navigation body; and
- determining, based on the real-time kinematic GPS data associated with the navigation body and the real-time kinematic GPS data associated with the target aircraft, a navigation correction.

25. The method of claim 24, wherein the inertial measurement unit data associated with the navigation body comprises change in velocity data and change in attitude angle data associated with the navigation body, and
wherein the inertial measurement unit data associated with the target aircraft comprises change in velocity data and change in attitude angle data associated with the target aircraft.

26. The method of claim 24, wherein the real-time kinematic GPS data associated with the navigation body comprises pseudo-range data and carrier phase data associated with the navigation body, and
wherein the real-time kinematic GPS data associated with the target aircraft comprises pseudo-range data and carrier phase data associated with the target aircraft.

27. The method of claim 24, wherein a rate of receiving inertial measurement unit data associated with the navigation body is greater than a rate of receiving real-time kinematic data associated with the navigation body.

28. The method of claim 27, wherein determining the navigation correction comprises determining that real-time kinematic GPS data associated with target aircraft and real-time kinematic GPS data associated with the navigation body are available.

29. The method of claim 24, wherein determining the navigation correction comprises determining that the real-time kinematic GPS data associated with the target aircraft and the real-time kinematic GPS data associated with the navigation body meet one or more quality criteria.

30. The method of claim 29, wherein the quality criteria comprise any combination of one or more of a noise level, a number of satellites, or a geometric dispersion of satellites.

* * * * *